(12) United States Patent
Shirouzu

(10) Patent No.: US 11,742,706 B2
(45) Date of Patent: Aug. 29, 2023

(54) STRUCTURE OF SINGLE-PHASE REACTOR

(71) Applicant: Fanuc Corporation, Yamanashi (JP)

(72) Inventor: Masatomo Shirouzu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 358 days.

(21) Appl. No.: 17/070,138

(22) Filed: Oct. 14, 2020

(65) Prior Publication Data

US 2021/0028659 A1 Jan. 28, 2021

Related U.S. Application Data

(62) Division of application No. 15/842,115, filed on Dec. 14, 2017, now abandoned.

(30) Foreign Application Priority Data

Dec. 22, 2016 (JP) ................................. 2016-249635

(51) Int. Cl.
| | |
|---|---|
| H01F 27/24 | (2006.01) |
| H02K 1/12 | (2006.01) |
| H02K 1/04 | (2006.01) |
| H01F 37/00 | (2006.01) |
| H01F 27/32 | (2006.01) |
| H01F 3/14 | (2006.01) |

(52) U.S. Cl.
CPC ................ *H02K 1/12* (2013.01); *H01F 3/14* (2013.01); *H01F 27/324* (2013.01); *H01F 37/00* (2013.01); *H01F 37/005* (2013.01); *H02K 1/04* (2013.01)

(58) Field of Classification Search
CPC .... H02K 1/12; H02K 1/04; H01F 3/14; H01F 27/324; H01F 37/00; H01F 37/005; H01F 27/24; H01F 30/10; H01F 30/12; H01F 30/14; H01F 38/22; H01F 38/38; H02M 1/0064

See application file for complete search history.

(56) References Cited

U.S. PATENT DOCUMENTS 2,406,704 A * 8/1946 Mossay .................. H01F 30/12
336/212
2,455,078 A 11/1948 McCreary
(Continued)

FOREIGN PATENT DOCUMENTS

DE 2508395 A1 8/1975
DE 102016010901 A1 3/2017
(Continued)

OTHER PUBLICATIONS

Entire patent prosecution history of U.S. Appl. No. 15/842,115, filed Dec. 14, 2017, entitled "Structure of Single-Phase Reactor."

*Primary Examiner* — Mang Tin Bik Lian
(74) *Attorney, Agent, or Firm* — RatnerPrestia

(57) ABSTRACT

A single-phase reactor includes an outer peripheral iron core, at least four iron cores, which are in contact with or coupled to the inner surface of the outer peripheral iron core, and coils which are wound around at least two iron cores of the at least four iron cores. Gaps, which can be magnetically coupled, are each formed between two adjacent ones of the at least four iron cores, or are formed between the at least four iron cores and a central iron core positioned at the center of the outer peripheral iron core.

9 Claims, 42 Drawing Sheets

(56) References Cited

U.S. PATENT DOCUMENTS

| | | | |
|---|---|---|---|
| 2,864,066 A * | 12/1958 | Egbert | B23Q 35/123 |
| | | | 336/134 |
| 3,622,868 A | 11/1971 | Todt | |
| 3,979,658 A | 9/1976 | Foster | |
| 4,206,434 A | 6/1980 | Hase | |
| 4,631,510 A | 12/1986 | Nagarkatti et al. | |
| 4,912,618 A * | 3/1990 | Krinickas, Jr. | H02M 5/42 |
| | | | 363/64 |
| 6,538,239 B1 * | 3/2003 | Anderson | H05B 6/44 |
| | | | 219/669 |
| 7,235,910 B2 | 6/2007 | Decristofaro et al. | |
| 7,796,003 B2 | 9/2010 | Hashino et al. | |
| 10,734,153 B2 | 8/2020 | Maeda et al. | |
| 10,748,703 B2 | 8/2020 | Shirouzu et al. | |
| 2007/0046415 A1 | 3/2007 | Wadlington et al. | |
| 2009/0058584 A1 | 3/2009 | Rastogi et al. | |
| 2009/0261939 A1 * | 10/2009 | Shudarek | H01F 27/263 |
| | | | 336/212 |
| 2012/0106210 A1 | 5/2012 | Xu et al. | |
| 2013/0187741 A1 * | 7/2013 | Goodrich | H01F 3/10 |
| | | | 336/170 |
| 2016/0125998 A1 | 5/2016 | Bhide et al. | |
| 2017/0011842 A1 | 1/2017 | Ishigaki et al. | |
| 2017/0040099 A1 | 2/2017 | Bhide et al. | |

FOREIGN PATENT DOCUMENTS

| | | |
|---|---|---|
| DE | 102017101156 A1 | 8/2017 |
| JP | 200077242 A | 3/2000 |
| JP | 2008210998 A | 9/2008 |
| JP | 2009170620 A | 7/2009 |
| JP | 2015159657 A | 9/2015 |
| JP | 2017059805 A | 3/2017 |
| WO | 2010119324 A2 | 10/2010 |
| WO | 2015142354 A1 | 9/2015 |

* cited by examiner

STRUCTURE OF SINGLE-PHASE REACTOR

CROSS-REFERENCE TO RELATED APPLICATIONS

This application is U.S. Divisional Application claiming benefit of priority to U.S. patent application Ser. No. 15/842,115, filed Dec. 14, 2017, which claims benefit of priority to Japanese Patent Application No. 2016-249635, filed Dec. 22, 2016, the disclosure of these applications are being incorporated herein by reference in their entirety for all purposes.

BACKGROUND OF THE INVENTION

1. Field of the Invention

The present invention relates to the structure of a single-phase reactor.

2. Description of the Related Art

Conventionally, in a single-phase reactor disclosed in, for example, Japanese Unexamined Patent Publication (Kokai) No. 2000-77242 and Japanese Unexamined Patent Publication (Kokai) No. 2008-210998, there is a problem in which a magnetic flux leaks from the vicinity of a gap and penetrates through windings, and then, generates eddy currents in the windings, and consequently, the temperature of the windings increases. Thus, conventionally, disposing the windings in the vicinity of the gap has been avoided, or the windings have been positioned away from the vicinity of the gap.

FIG. 14A is a sectional view of a conventional single-phase reactor. As shown in FIG. 14A, a single-phase reactor 100 includes a substantially E-shaped first iron core 150, which includes two first outside legs 151 and 152 and a first central leg 153 disposed between the first outside legs 151 and 152, and a substantially E-shaped second iron core 160, which includes two second outside legs 161 and 162 and a second central leg 163 disposed between the second outside legs 161 and 162.

Further, coils 171 and 172 are respectively wound around the first central leg 153 and the second central leg 163. As illustrated, the two first outside legs 151 and 152 of the first iron core 150 are connected to the two second outside legs 161 and 162 of the second iron core 160. Further, the first central leg 153 faces the second central leg 163, and a gap G is formed therebetween.

SUMMARY OF THE INVENTION

FIG. 14B is a partially enlarged view of the single-phase reactor shown in FIG. 14A. A magnetic flux, designated by an arrow A1 in FIG. 14B, leaks from the second central leg 163 in the vicinity of the gap G, and reaches the first central leg 153. In contrast, magnetic fluxes, designated by arrows A2 to A4, from the second central leg 163 do not reach the first central leg 153, but reach the second outside leg 162. Such magnetic fluxes A2 to A4 pass through the coil 172, and accordingly, an eddy current loss occurs in the coil.

FIG. 14C is a view of a simulation of a magnetic flux of the single-phase reactor shown in FIG. 14A. Connection portions between the first outside legs 151 and 152 and the second outside legs 161 and 162 are positioned corresponding to the position of the gap G.

Further, the first outside legs 151 and 152 are parallel to the first central leg 153, and the second outside legs 161 and 162 are parallel to the second central leg 163. Thus, as shown in FIG. 14C, a leakage flux from the vicinity of the gap G tends to be radiated to the connection portions between the first outside legs 151 and 152 and the second outside legs 161 and 162.

FIG. 14D is another view of magnetic fluxes of the single-phase reactor shown in FIG. 14A. As shown in FIG. 14D, magnetic fluxes leaking from the vicinity of the gap G tend to penetrate through the coils 171 and 172 and to flow into the adjacent outside legs. Thus, even if the coils 171 and 172 are positioned away from the vicinity of the gap G, effects that reduce the eddy current loss in the coils are limited.

The present invention was made in view of such circumstances and has an object to provide a single-phase reactor in which the eddy current loss in coils, caused by the leakage flux from gaps or the vicinity of the gaps, can be reduced.

In order to achieve the above object, according to a first aspect of the invention, there is provided a single-phase reactor including an outer peripheral iron core, and at least four iron core coils, which are in contact with or coupled to the inner surface of the outer peripheral iron core. The at least four iron core coils each include an iron core and a coil wound around the iron core. Gaps, which can be magnetically coupled, are each formed between two adjacent ones of the at least four iron cores.

In the first aspect of the invention, the gaps, which can be magnetically coupled, are disposed in the vicinity of the center of the single-phase reactor. Further, the angle between the iron cores with a gap being located therebetween is less than 180 degrees. Thus, the leakage flux from each iron core tends to easily enter the adjacent and nearest iron core, and accordingly, the leakage flux penetrating through the coil can be reduced more than a conventional case. Further, the coils can be positioned away from the gaps. Thus, the proportion of the leakage flux from the vicinity of each gap, which penetrates through a winding, can be reduced. Consequently, the eddy current loss in each coil can be reduced.

These objects, features, and advantages of the present invention and other objects, features, and advantages will become further clearer from the detailed description of typical embodiments illustrated in the appended drawings.

DETAILED DESCRIPTION

Figure 1A:
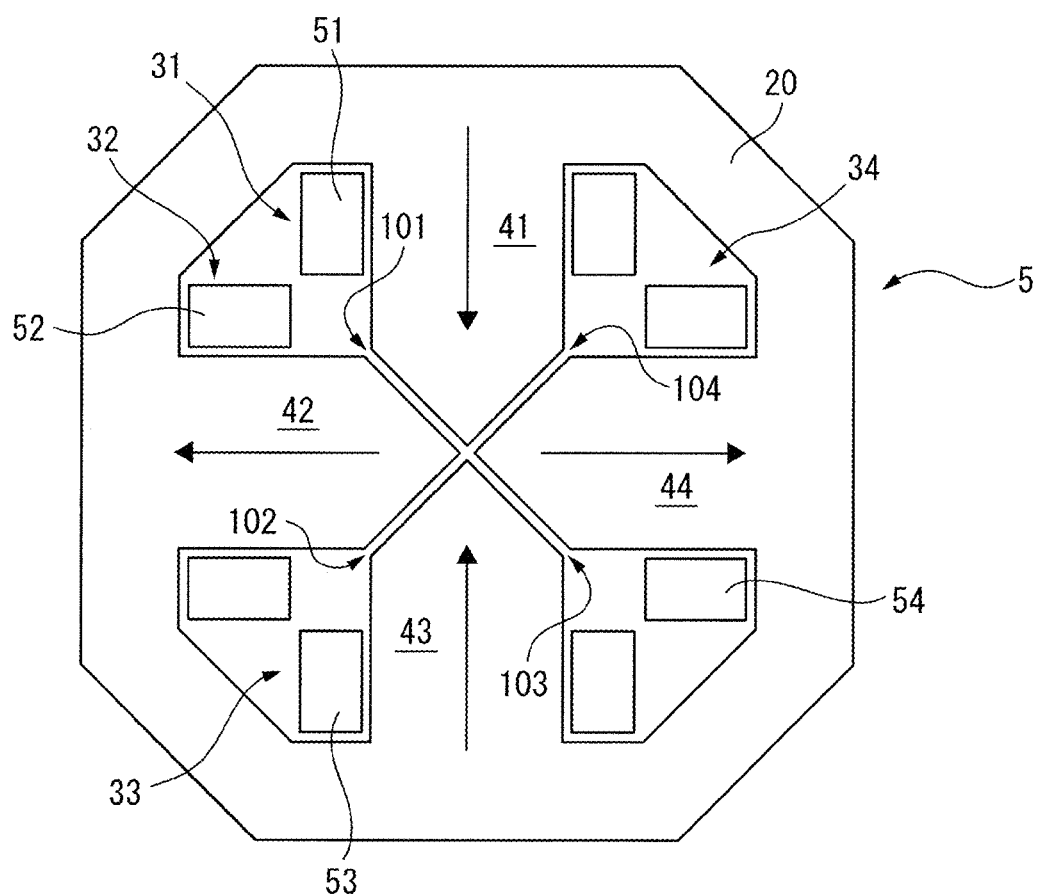
FIG. 1A is a sectional view of a single-phase reactor based on a first embodiment of the present invention.

Embodiments of the present invention will be described below with reference to the accompanying drawings. In the following figures, similar members are designated with the same reference numerals. These figures are properly modified in scale to assist the understanding thereof.

Figure 1B:
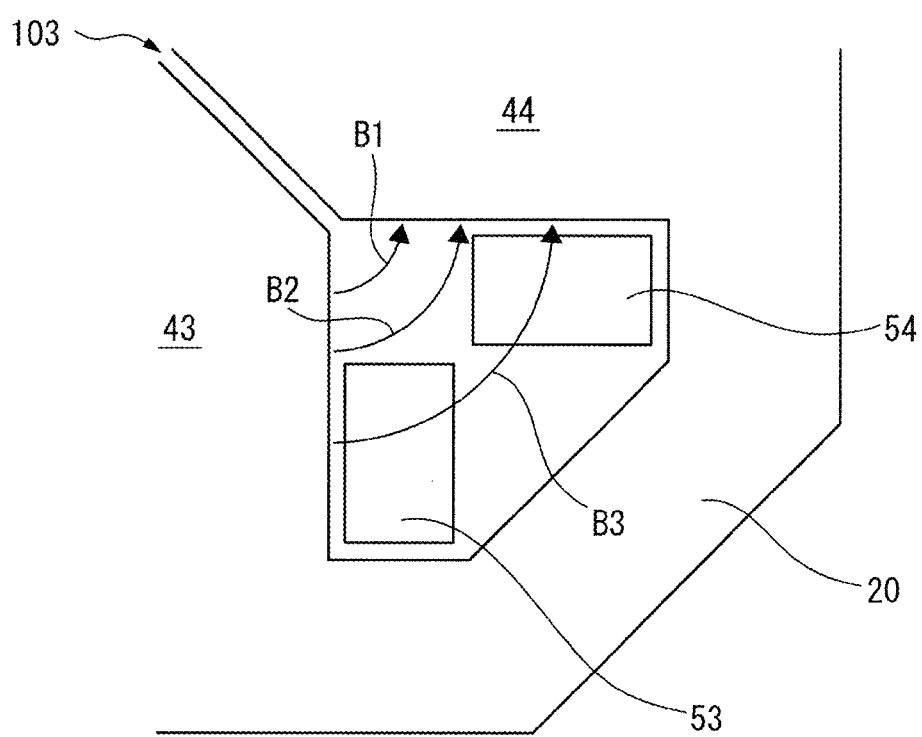
FIG. 1B is a partially enlarged view of the single-phase reactor shown in FIG. 1A.
Figure 1C:
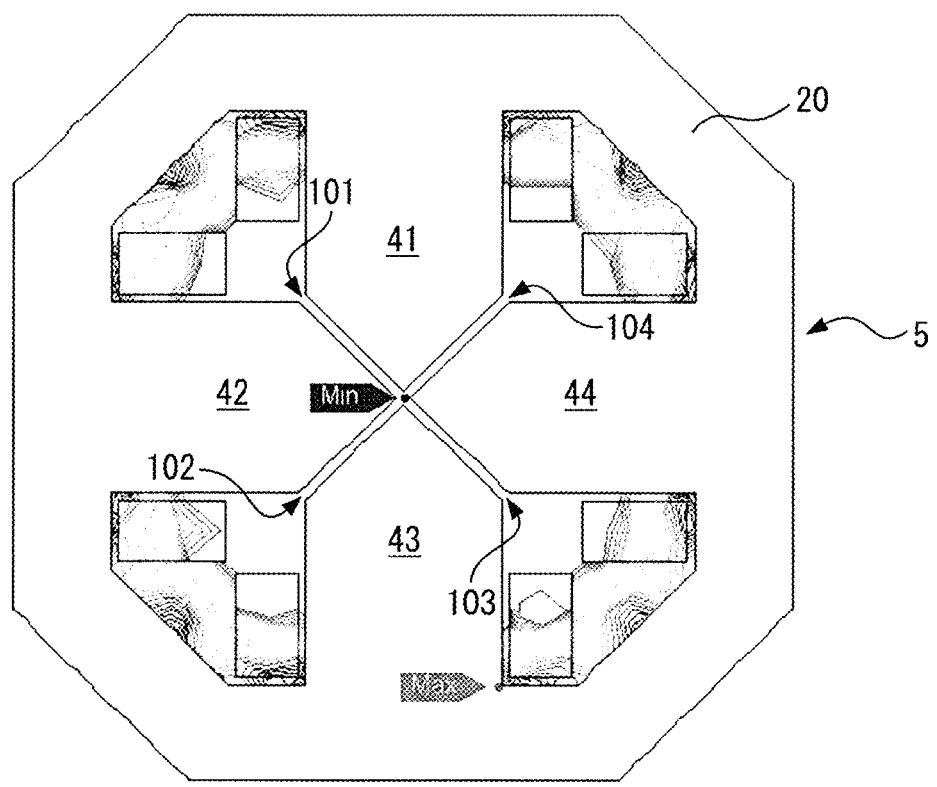
FIG. 1C is a view of magnetic fluxes in the single-phase reactor shown in FIG. 1A.
Figure 1D:
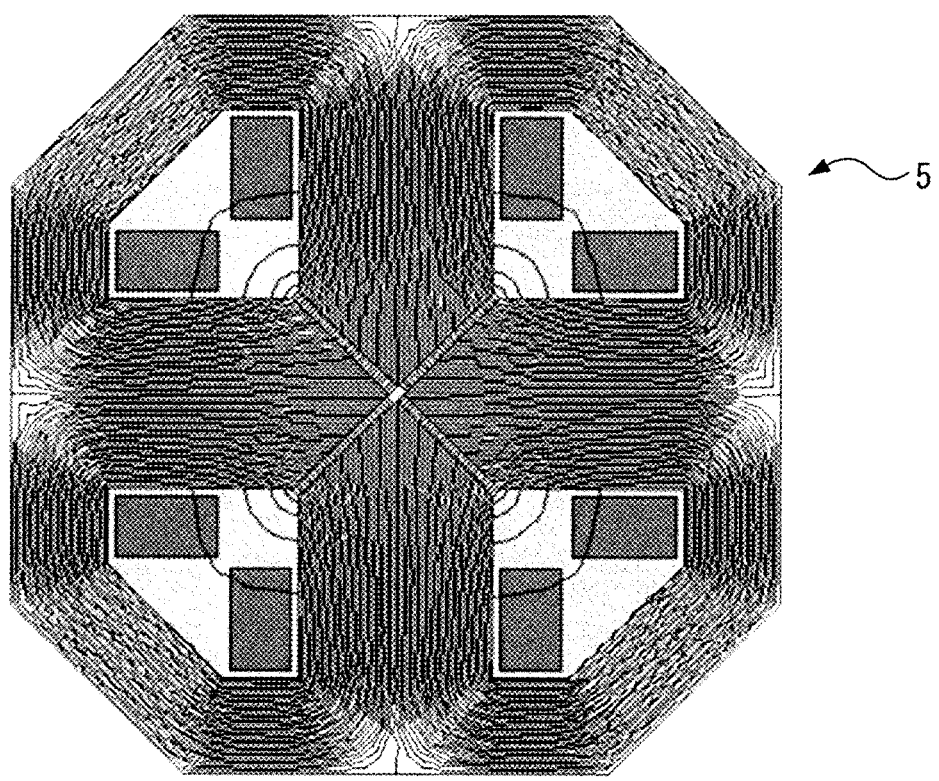
FIG. 1D is another view of magnetic fluxes of the single-phase reactor shown in FIG. 1A.

FIG. 1A is a sectional view of a single-phase reactor based on a first embodiment of the present invention. FIG. 1B is a partially enlarged view of the single-phase reactor shown in FIG. 1A. FIG. 1C and FIG. 1D are views of magnetic fluxes of the single-phase reactor shown in FIG. 1A.

As shown in FIG. 1A, a single-phase reactor 5 includes an outer peripheral iron core 20 and four iron core coils 31 to 34 which are magnetically coupled to the outer peripheral iron core 20. In FIG. 1A, the iron core coils 31 to 34 are disposed inside the outer peripheral iron core 20 having an octagon shape. Note that the outer peripheral iron core 20 may have a circular shape or another polygonal shape. The iron core coils 31 to 34 are arranged at equal intervals in the circumferential direction of the single-phase reactor 5. The iron core coils are only required to be circumferentially arranged, and do not necessarily have to be arranged at equal intervals.

As can be seen from FIG. 1A, the iron core coils 31 to 34 respectively include iron cores 41 to 44, which radially extend, and coils 51 to 54 wound around the iron cores. The radially outside ends of the iron cores 41 to 44 are in contact with the outer peripheral iron core 20, or integral with the outer peripheral iron core 20.

Further, the radially inside ends of the iron cores 41 to 44 are positioned in the vicinity of the center of the outer peripheral iron core 20. In FIG. 1A etc., the radially inside ends of the iron cores 41 to 44 converge on the center of the outer peripheral iron core 20, and the tip angle of each end is approximately 90 degrees. Note that, as each tip angle increases or decreases from 90 degrees, the area of each gap increases, but the magnetic flux saturation is easily caused by less current. Further, the radially inside ends of the iron cores 41 to 44 are spaced from one another via gaps 101 to 104 which can be magnetically coupled.

In other words, in the first embodiment, the radially inside end of the iron core 41 is spaced from the radially inside ends of the two iron cores 42 and 44 adjacent thereto via the gaps 101 and 104. The same is true for the other iron cores 42 to 44. Note that it is ideal that the gaps 101 to 104 have the same dimensions, but it is acceptable that they have different dimensions. Further, in embodiments that will be described later, descriptions of, e.g., "gaps 101 to 104" and "iron core coils 31 to 34", are omitted in some cases.

Thus, as shown in FIG. 1A, a single, substantially E-shaped gap comprised of the gaps 101 to 104 is formed at the center of the single-phase reactor 5. The gaps 101 to 104 are arranged at equal intervals in the circumferential direction of the single-phase reactor 5.

As seen above, in the present invention, a central iron core, which is positioned at the center of the single-phase reactor 5, is not necessary, and accordingly, the single-phase reactor 5, which has a light weight and a simple structure, can be obtained. Further, the four iron core coils 31 to 34 are surrounded by the outer peripheral iron core 20, and accordingly, magnetic fields, which have occurred from the coils 51 to 54, do not leak to the outside of the outer peripheral iron core 20. Further, the gaps 101 to 104 having a given thickness can be provided at a low cost. Thus, this reactor is advantageous in design to a reactor having a conventional structure.

In the meantime, magnetic fluxes, designated by arrows B1 and B2 in FIG. 1B, leak from the iron core 43 in the vicinity of the gap 103, and reach the iron core 44. In contrast, a magnetic flux, designated by an arrow B3, from the iron core 43 passes through the coils 53 and 54, and accordingly, eddy current losses occur in the coils 53 and 54.

In the present invention, the four iron cores 41 to 44 are circumferentially arranged at equal intervals. Thus, the angle between the center lines of two adjacent ones of the iron cores, with the corresponding one of the gaps 101 to 104 being located therebetween, is 90 degrees.

Figure 14A:
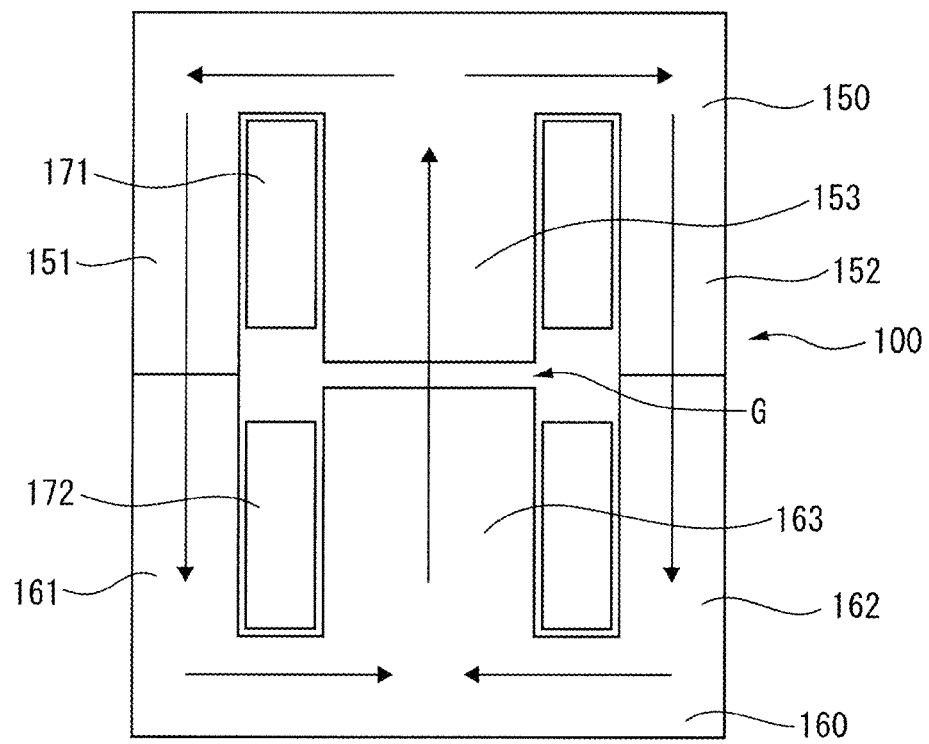
FIG. 14A is a sectional view of a conventional single-phase reactor.
Figure 14B:
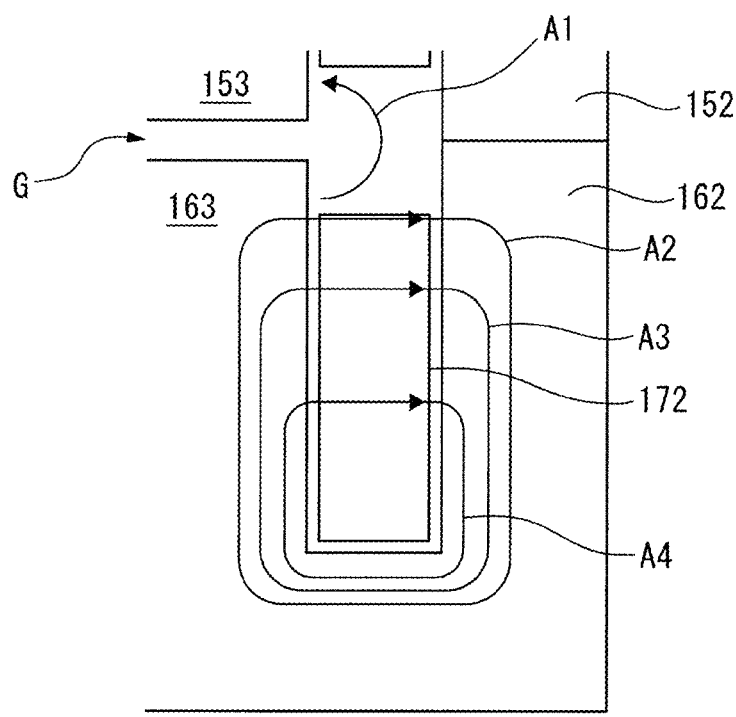
FIG. 14B is a partially enlarged view of the single-phase reactor shown in FIG. 14A.

In contrast, in a conventional technology, as shown in FIG. 14A etc., the angle between two iron cores is 180 degrees. In other words, in the present invention, the angle between the center lines of two adjacent iron cores is less than 180 degrees. Thus, the leaked magnetic flux in the present invention is more difficult to diffuse from the vicinity of a gap than a conventional case, and tends to easily enter the nearest iron core.

Note that FIG. 1C is a view of a simulation of magnetic fluxes of the single-phase reactor shown in FIG. 1A. In FIG. 1C, as the distance from the gaps 101 to 104 increases, the leakage flux density decreases. Further, in FIG. 1C, magnetic fluxes flow as shown in FIG. 1A, and accordingly, repel one another at the center. Thus, the magnetic flux density is minimum at the center.

Figure 14C:
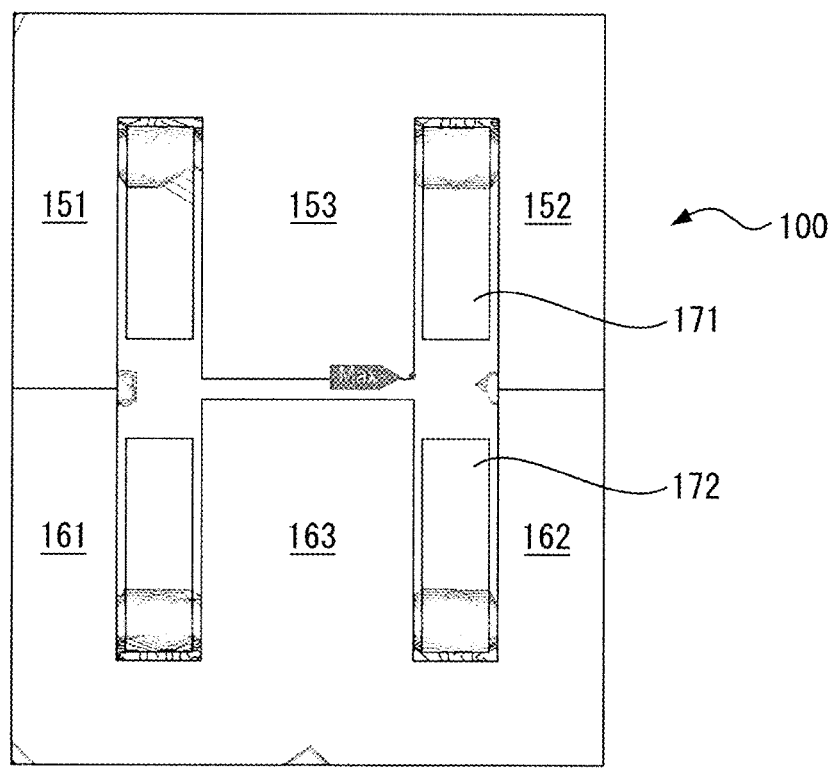
FIG. 14C is a view of magnetic fluxes of the single-phase reactor shown in FIG. 14A.
Figure 14D:
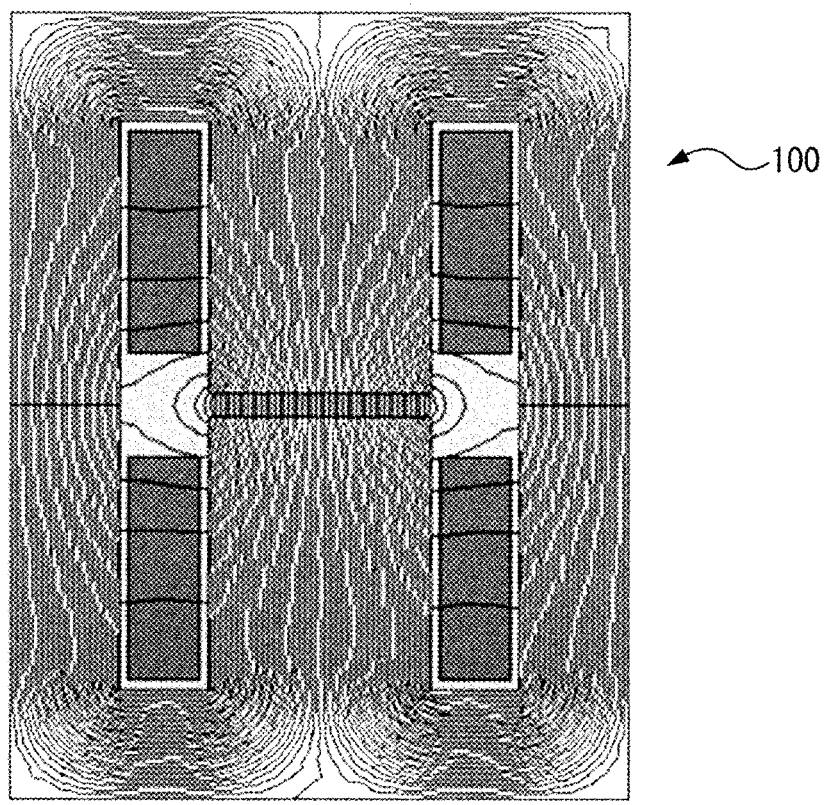
FIG. 14D is another view of magnetic fluxes of the single-phase reactor shown in FIG. 14A

In the blank portion of FIG. 1C, the density of magnetic fluxes leaking from the gaps 101 to 104 is 0.03 T or higher. The same is true in FIG. 14C. As can be seen from the comparison between FIG. 1C and FIG. 14C, the blank portion of each coil in FIG. 1C of the present invention is smaller than the blank portion of each coil in FIG. 14C. In other words, in the present invention, the proportion of portions, which have a low density of magnetic fluxes penetrating through the coils, is high, and accordingly, the leakage fluxes penetrating through the coils can be reduced more than a conventional case.

Further, as can be seen from FIG. 1A and FIG. 1D, the coils 51 to 54 are disposed in the vicinity of the inner surface of the outer peripheral iron core 20. In other words, the coils 51 to 54 in the present invention are positioned away from the gaps 101 to 104. Thus, as can be seen from FIG. 1D, the proportion of the leakage flux penetrating through the coils 51 to 54 is reduced. Consequently, it will be understood that the eddy current loss in each coil can be reduced.

Further, in the present invention, it is preferable to reduce the thickness of the gaps 101 to 104 by increasing the sectional areas of the iron cores 41 to 44. This reduces leakage fluxes from the vicinity of the gaps, as well as the number of turns of the coils 51 to 54, and accordingly, further reduces magnetic fluxes penetrating through the coils 51 to 54.

Further, in FIG. 1A, the coils 51 to 54 are wound so that magnetic fluxes from a pair of opposed iron core coils 31 and 33 flow toward the center of the single-phase reactor 5, and magnetic fluxes from a pair of opposed iron core coils 32 and 34 flow from the center to the radially outside. However, the coils 51 to 54 may be wound so that all magnetic fluxes occurring from the iron core coils 31 to 34 flow toward the center of the single-phase reactor 5. In this case, the magnetic fluxes can be canceled one another.

Figure 2:
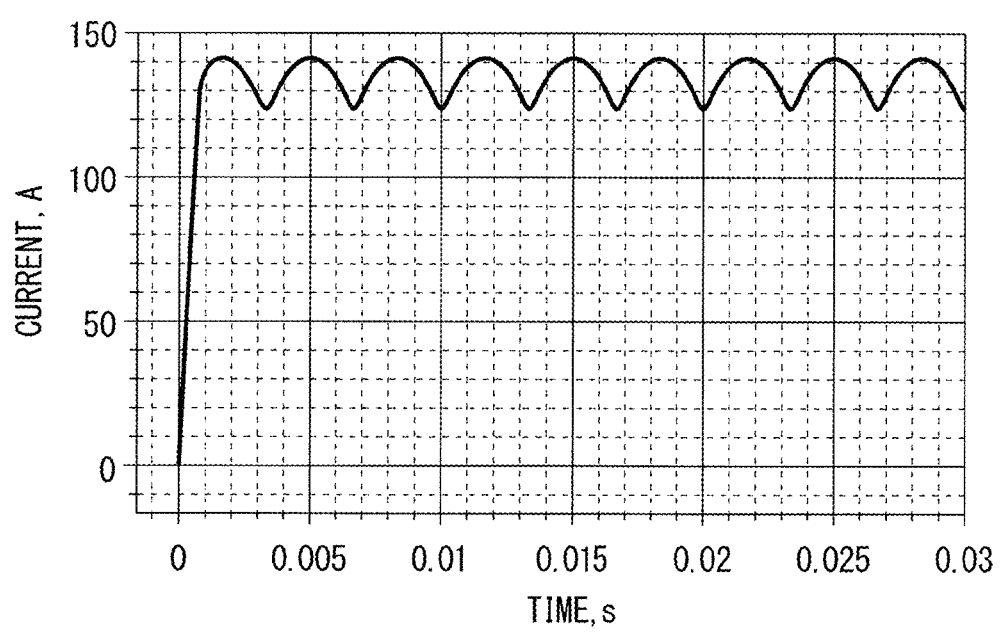
FIG. 2 is a view of the relationship between current and time.

FIG. 2 is a view of the relationship between current and time. In FIG. 2, the horizontal axis represents time, and the vertical axis represents current obtained when the current obtained by rectifying the full wave of three-phase alternating current using a diode is applied to the coils of the single-phase reactor 5. Such current exhibits behavior shown in FIG. 2. Each simulation shows a result obtained when the current shown in FIG. 2 is input.

Figure 3:
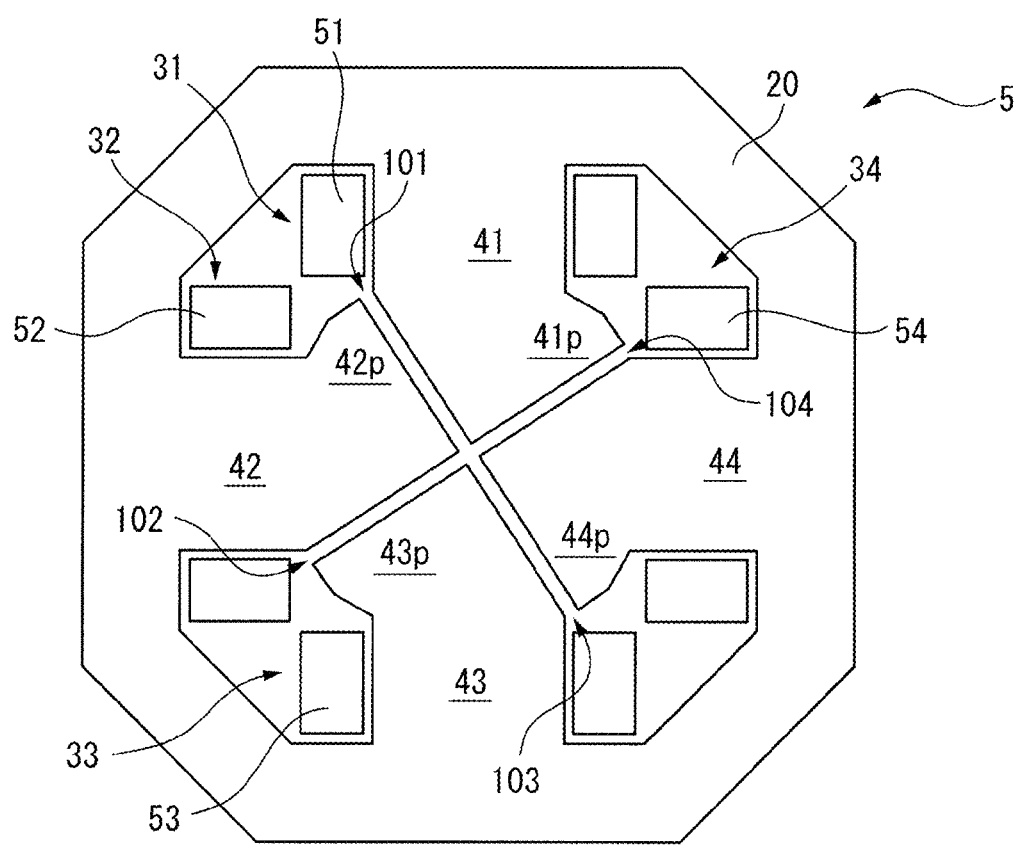
FIG. 3 is a sectional view of a single-phase reactor based on a second embodiment of the present invention.

FIG. 3 is a sectional view of a single-phase reactor based on a second embodiment of the present invention. In FIG. 3, the iron cores 41 to 44 respectively have, in the vicinity of their radially inside ends, protrusions 41p to 44p, which clockwise extend and which are shaped like a sector. The protrusions 41p to 44p each extend in an area between adjacent ones of the end faces of the coils in FIG. 1. The shape of the tip surfaces of the iron cores 41 to 44, which face the corresponding protrusions 41p to 44p, is configured to be complementary with the shape of the protrusions 41p to 44p.

The distance between each of the protrusions 41p to 44p and the adjacent one of the iron cores 41 to 44 is similar to that of FIG. 1. Further, even in FIG. 3, the shapes of the iron cores 41 to 44 are identical to one another. Note that the protrusions 41p to 44p may extend counterclockwise.

In such a case, the widths (radial distances) of the gaps 101 to 104 are larger than those of FIG. 1. It will be understood that this increases the inductance. Note that, in the embodiment shown in FIG. 3, the shapes of the iron cores 41 to 44 are identical to one another. However, they may be different from one another. Further, the gaps 101 to 104 may be curved gaps but not straight gaps. Even such a case is included in the scope of the present invention. Note that the same is true in other embodiments that will be described later.

Figure 4:
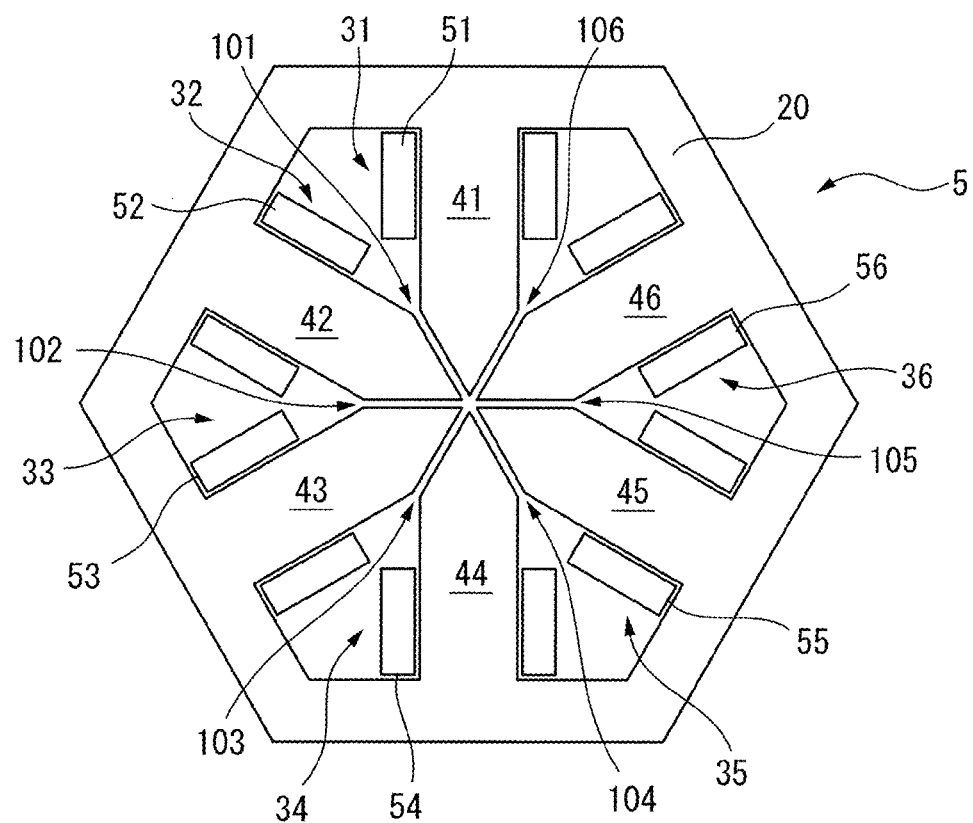
FIG. 4 is a sectional view of a single-phase reactor based on a third embodiment of the present invention.

FIG. 4 is a sectional view of a single-phase reactor based on a third embodiment of the present invention. The single-phase reactor 5 shown in FIG. 4 includes an outer peripheral iron core 20, and iron core coils 31 to 36, which are magnetically coupled to the outer peripheral iron core 20 and which are similar to the aforementioned iron core coils. The iron core coils 31 to 36 respectively include iron cores 41 to 46, which extend radially, and coils 51 to 56 wound around the iron cores.

The tip angle of each of the radially inside ends of the iron cores 41 to 46 of the single-phase reactor 5 shown in FIG. 4 is approximately 60 degrees. Further, the radially inside ends of the iron cores 41 to 46 are spaced from one another via gaps 101 to 106 which can be magnetically coupled. In this way, the single-phase reactor 5 may include iron core coils 31 to 36, the number of which is an even number not less than 6.

It will be obvious that, even in the third embodiment, an effect substantially similar to the aforementioned effect can be obtained. Further, in the third embodiment, the number of the iron core coils 31 to 36 is set to be an even number not less than 6, and accordingly, there are a plurality of iron core coils for one phase. Further, the sectional area of each iron core coil can be reduced by connecting the iron core coils in parallel. Further, the inductance can be increased by connecting the iron core coils in series.

Figure 5A:
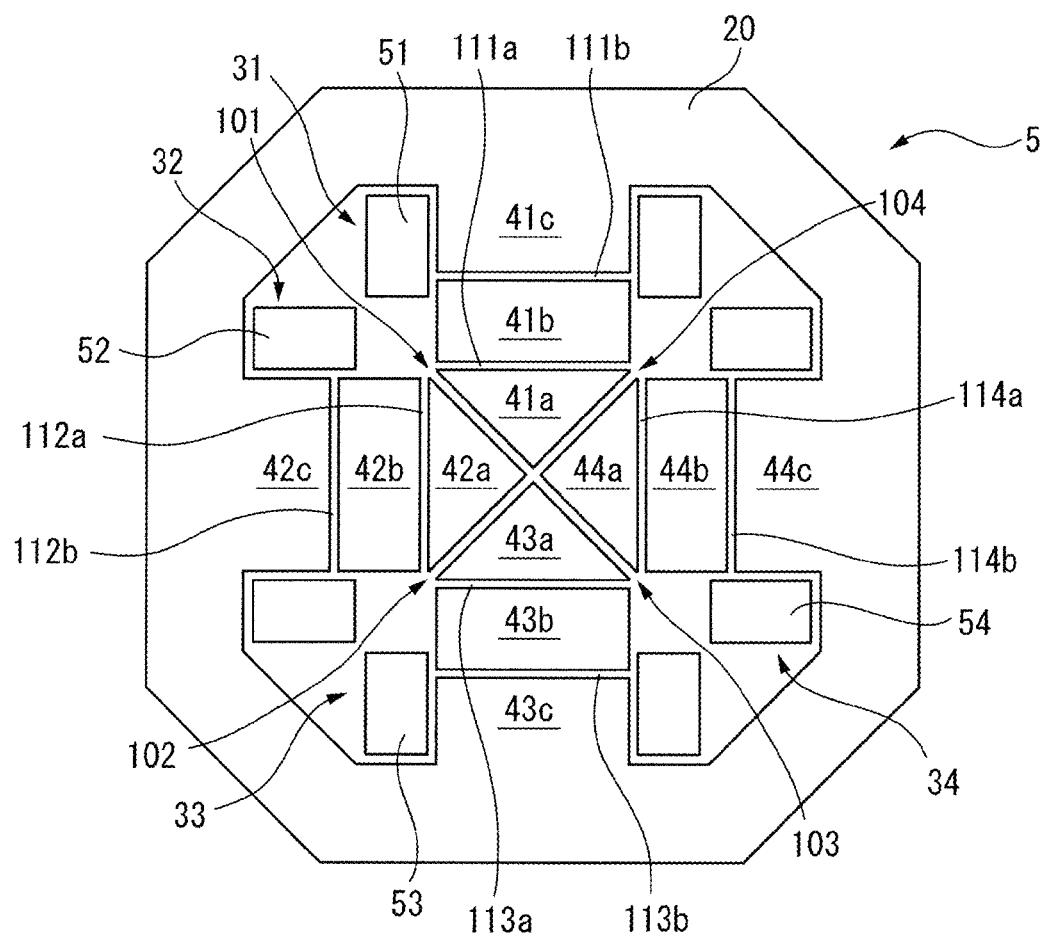
FIG. 5A is a sectional view of a single-phase reactor based on a fourth embodiment of the present invention.

FIG. 5A is a sectional view of a single-phase reactor based on a fourth embodiment of the present invention. In the single-phase reactor 5 shown in FIG. 5A, iron cores 41 to 44, which extend in the radial directions of iron core coils 31 to 34, respectively include first iron core portions 41a to 44a positioned on the radially inside, third iron core portions 41c to 44c positioned on the radially outside, and second iron core portions 41b to 44b positioned between the first iron core portions 41a to 44a and the third iron core portions 41c to 44c.

First iron core portion gaps 11a to 114a, which can be magnetically coupled, are formed between the first iron core portions 41a to 44a and the second iron core portions 41b to 44b. Likewise, second iron core portion gaps 111b to 114b, which can be magnetically coupled, are formed between the second iron core portions 41b to 44b and the third iron core portions 41c to 44c. Further, the single-phase reactor 5 includes coils 51 to 54, which are wound around both the second iron core portions 41b to 44b and the third iron core portions 41c to 44c. Note that the coils 51 to 54 may also be wound around the first iron core portions 41a to 44a.

In such a case, a gap, which is originally only the gap 101, for one iron core, e.g., the iron core 41 is divided into the gap 101, the first iron core portion gap 11a, and the second iron core portion gap 111b, and accordingly, the thickness of each gap reduces. The thickness of each gap in this case means a thickness of the gap 101 obtained by dividing the original gap, a distance between the first iron core portion 41a and the second iron core portion 41b, and a distance between the second iron core portion 41b and the third iron core portion 41c.

In the fourth embodiment, the thickness of each gap can be reduced, and accordingly, the leakage flux from each gap can be reduced. Further, the iron cores 41 to 44 are comprised of the first iron core portions 41a to 44a, the second iron core portions 41b to 44b, and the third iron core portions 41c to 44c, and accordingly, the single-phase reactor 5 can be easily assembled. Thus, in the embodiment shown in FIG. 5A, it is not necessary to divide the outer peripheral iron core 20. Note that, of course, the iron cores 41 to 44 may be each comprised of two or more iron core portions arranged in a line.

Figure 5B:
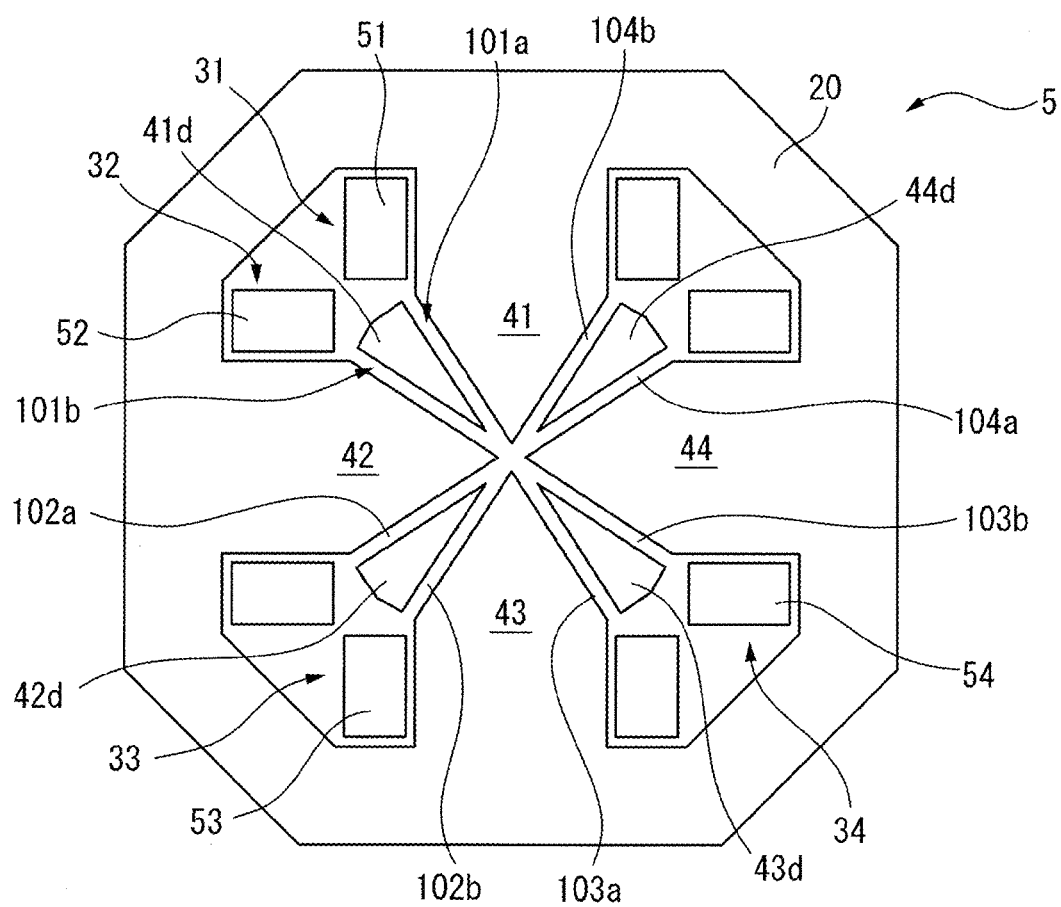
FIG. 5B is a sectional view of another single-phase reactor based on the fourth embodiment of the present invention.

FIG. 5B is a sectional view of another single-phase reactor based on the fourth embodiment of the present invention. In FIG. 5B, additional iron cores 41d to 44d are disposed in areas of the gaps 101 to 104 in FIG. 1A. The cross-sectional surface of each of the additional iron cores 41d to 44d is shaped like a sector. Note that the cross-sectional surface of each of the additional iron cores 41d to 44d may be shaped like an isosceles triangle.

The radially inside ends of the iron cores 41 to 44 each include two tip surfaces. As shown in FIG. 5B, each of the two flat surfaces of each of the additional iron cores 41d to 44d is parallel to the adjacent one of the tip surfaces of the iron cores. Further, gaps 101a to 104a and 101b to 104b, which can be magnetically coupled, are formed between the flat surfaces of the additional iron cores 41d to 44d and the tip surfaces of the iron cores 41 to 44. Note that, in FIG. 5B, it will be obvious that the angle between the two tip surfaces of each of the iron cores 41 to 44 is less than 60 degrees.

The number of gaps in FIG. 5B is eight, which is double the number of gaps shown in FIG. 1A. Thus, the thickness of each gap, i.e., the distance between each of the flat surfaces of the additional iron cores 41d to 44d and the adjacent one of the tip surfaces of the iron cores 41 to 44 can be reduced by half, and accordingly, the leakage flux can be reduced.

Figure 6:
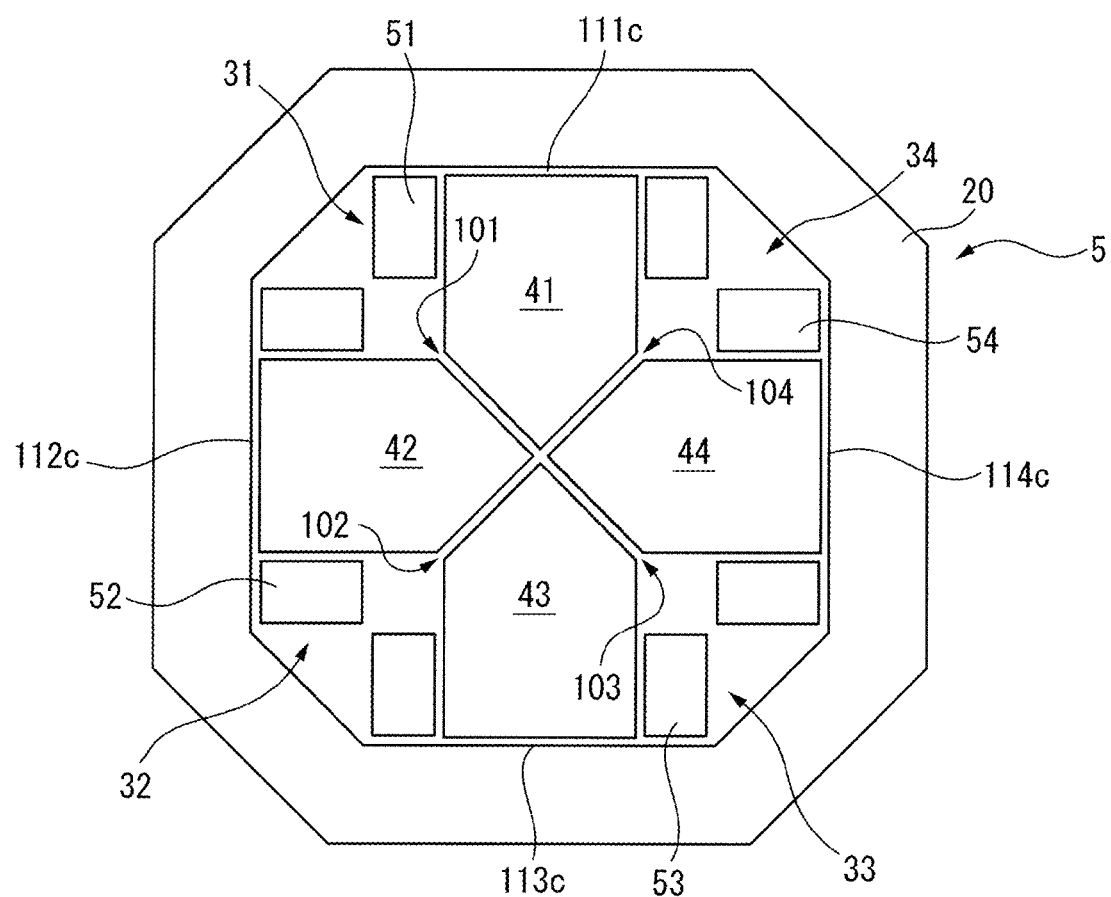
FIG. 6 is a sectional view of another single-phase reactor based on a fifth embodiment of the present invention.

FIG. 6 is a sectional view of a single-phase reactor based on a fifth embodiment of the present invention. The iron core coils 31 to 34 of the single-phase reactor 5 shown in FIG. 6 include iron cores 41 to 44, which extend radially, and coils 51 to 54 wound around the iron cores. The radially inside ends of the iron cores 41 to 44 are adjacent one another via gaps 101 to 104 as in the aforementioned embodiments.

In the fifth embodiment, outer peripheral iron core gaps 111c to 114c, which can be magnetically coupled, are respectively formed between the radially outside ends of the iron cores 41 to 44 and an outer peripheral iron core 20. When the single-phase reactor 5 operates, heat occurs in the iron core coils 31 to 34. In the fifth embodiment, the outer peripheral iron core gaps 111c to 114c are formed, and accordingly, the heat occurring from the iron core coils 31 to 34 is difficult to transfer to the outer peripheral iron core 20.

Figure 7:
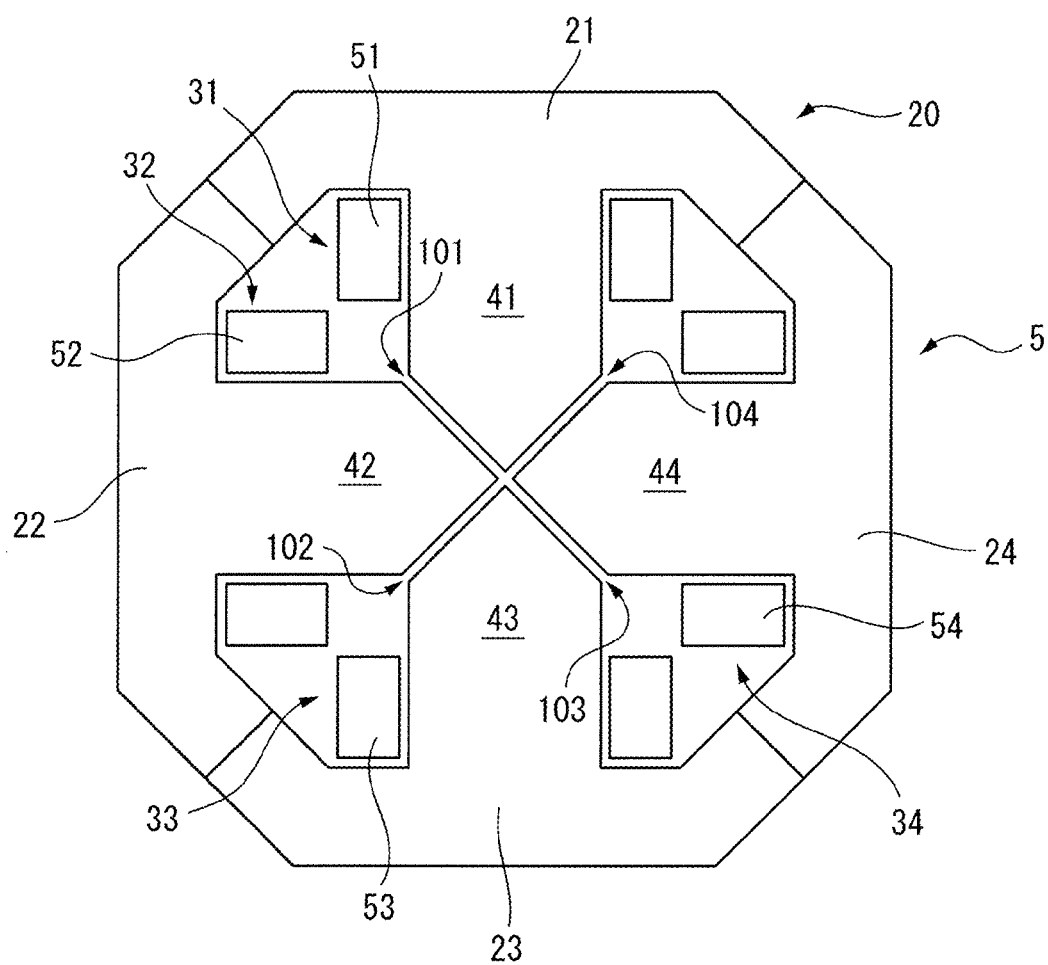
FIG. 7 is a sectional view of a single-phase reactor based on a sixth embodiment of the present invention.

FIG. 7 is a sectional view of a single-phase reactor based on a sixth embodiment of the present invention. The iron core coils 31 to 34 of the single-phase reactor 5 shown in FIG. 7 are substantially similar to those which have been described with reference to FIG. 1. In the sixth embodiment, the outer peripheral iron core 20 is comprised of a plurality of, e.g., four outer peripheral iron core portions 21 to 24. In FIG. 7, the outer peripheral iron core portion 21 is in contact with or integral with an iron core 41. Likewise, the outer peripheral iron core portions 22 to 24 are respectively in contact with or integral with iron cores 42 to 44. In the embodiment shown in FIG. 7, even if the outer peripheral iron core 20 is large, such an outer peripheral iron core 20 can be easily produced.

Figure 8:
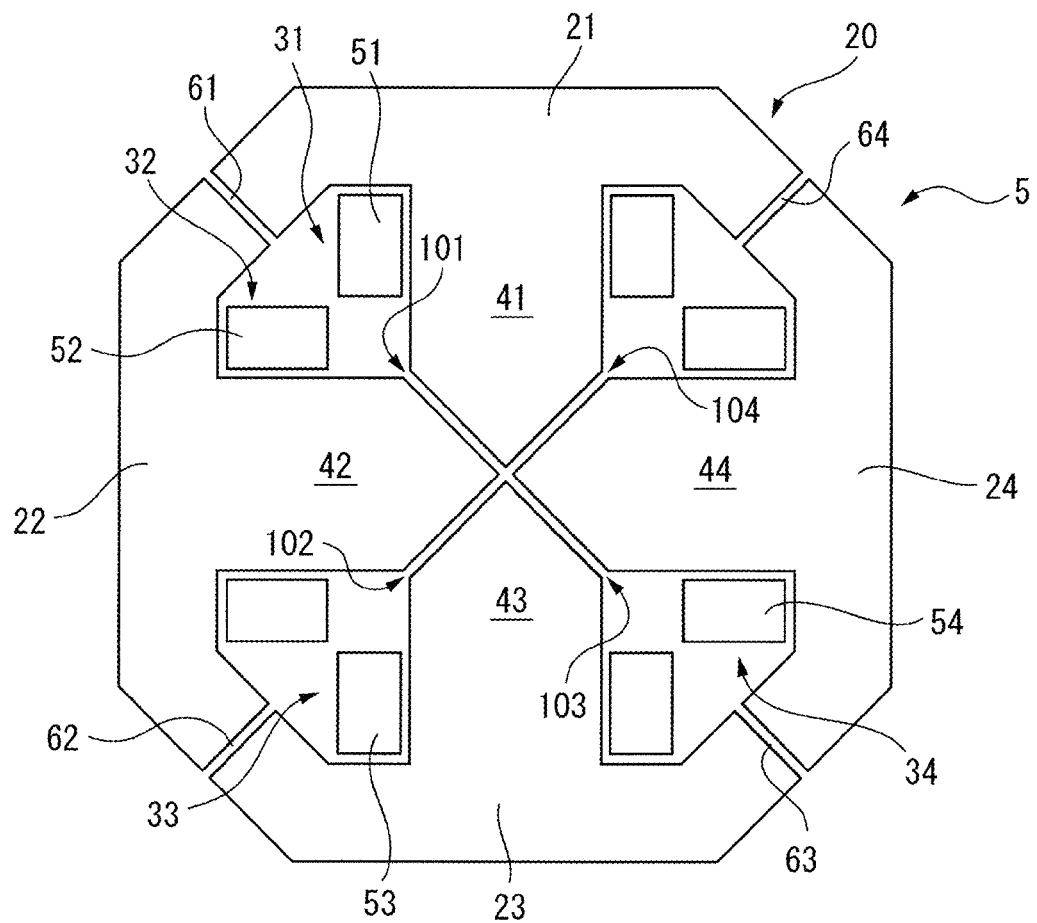
FIG. 8 is a sectional view of a single-phase reactor based on a seventh embodiment of the present invention.

FIG. 8 is a sectional view of a single-phase reactor based on a seventh embodiment of the present invention. In the seventh embodiment, an outer peripheral iron core portion gap 61, which can be magnetically coupled, is formed between an outer peripheral iron core portion 21 and an outer peripheral iron core portion 22. Likewise, outer peripheral iron core portion gaps 62 to 64, which can be magnetically coupled, are respectively formed between an outer peripheral iron core portion 22 and an outer peripheral iron core portion 23, between the outer peripheral iron core portion 23 and an outer peripheral iron core portion 24, and between the outer peripheral iron core portion 24 and the outer peripheral iron core portion 21.

In other words, the outer peripheral iron core portions 21 to 24 are arranged via the outer peripheral iron core portion gaps 61 to 64. In such a case, the outer peripheral iron core portion gaps 61 to 64 can be adjusted by adjusting the lengths of the outer peripheral iron core portions 21 to 24. Consequently, it will be understood that the unbalance of the inductance of the single-phase reactor 5 can be adjusted.

The single-phase reactor 5 shown in FIG. 8 differs from the single-phase reactor 5 shown in FIG. 7 only in that it has the outer peripheral iron core portion gaps 61 to 64. In other words, in the sixth embodiments, each of the outer peripheral iron core portion gaps 61 to 64 is not formed between the corresponding adjacent ones of the outer peripheral iron core portions 21 to 24. In the embodiments shown in FIG. 7 and FIG. 8, even if the outer peripheral iron core 20 is large, such an outer peripheral iron core 20 can be easily produced.

Figure 9:
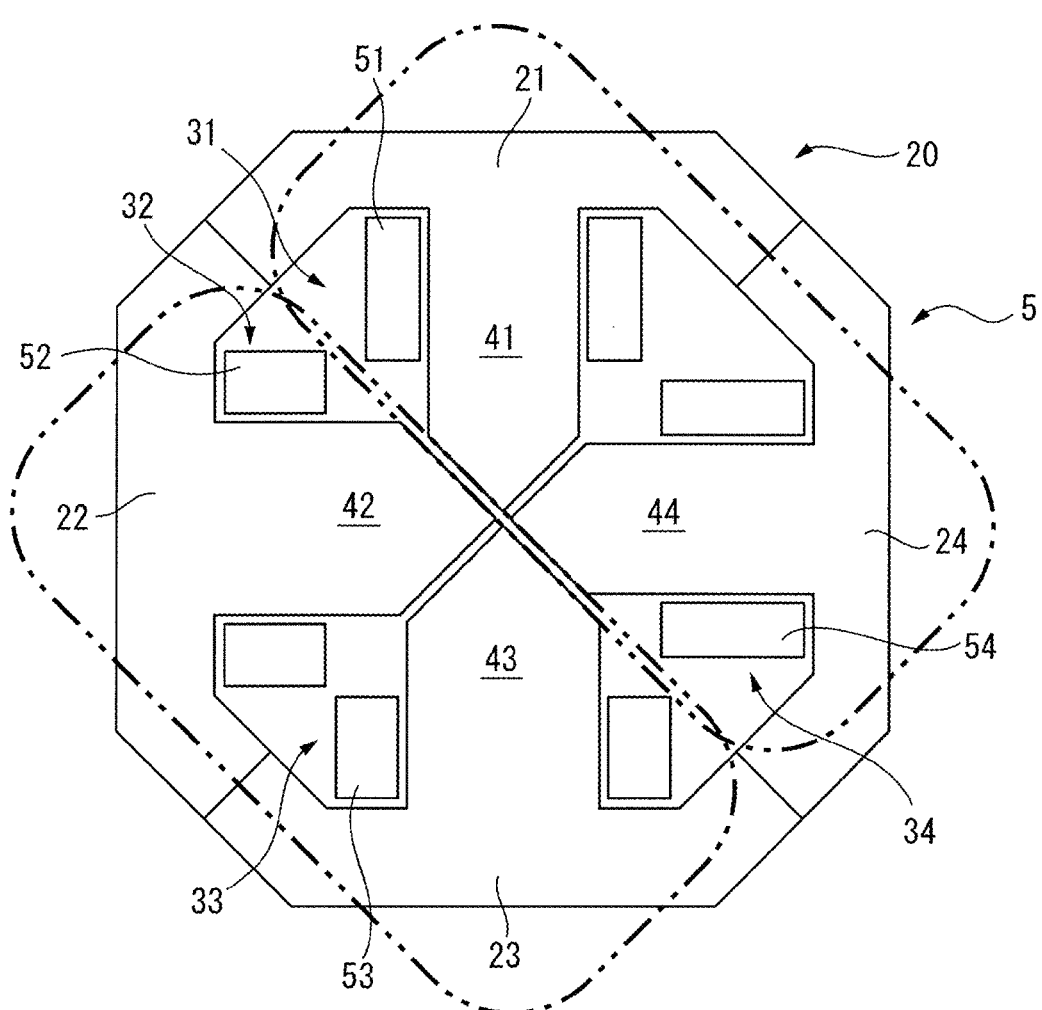
FIG. 9 is a sectional view of a single-phase reactor based on an eighth embodiment of the present invention.

FIG. 9 is a sectional view of a single-phase reactor based on an eighth embodiment of the present invention. The single-phase reactor 5 shown in FIG. 9 is substantially similar to the single-phase reactor 5 shown in FIG. 1A, and accordingly, the detailed description thereof is omitted. However, in FIG. 9, the sectional areas of coils 51 and 54 of iron core coils 31 and 34 are larger than the sectional areas of coils 52 and 53 of iron core coils 32 and 33. Further, iron cores 41 and 44 of the iron core coils 31 and 34 are narrower than iron cores 42 and 43 of the iron core coils 32 and 33. Note that the gaps 101 to 104 have the same dimensions.

In other words, as designated by two-dot chain lines in FIG. 9, the single-phase reactor 5 includes a first set comprised of two iron core coils 31 and 34 and a second set comprised of the other two iron core coils 32 and 33. The first set and the second set each include two adjacent ones of the four iron core coils 31 to 34. In the single-phase reactor 5 shown in FIG. 9, the dimensions of the iron cores, the sectional areas of the coils, and the number of turns differ between the first set and the second set. Note that, in the single-phase reactor 5, the dimensions of the gaps in the first set may be different from those in the second set.

Thus, in the embodiment shown in FIG. 9, two reactors having different properties can substantially be included in one single-phase reactor 5. Thus, the installation space for two reactors having different properties can be reduced. Further, it will be understood that connecting two reactors in series or in parallel enables adjustment of the inductance value.

Figure 10:
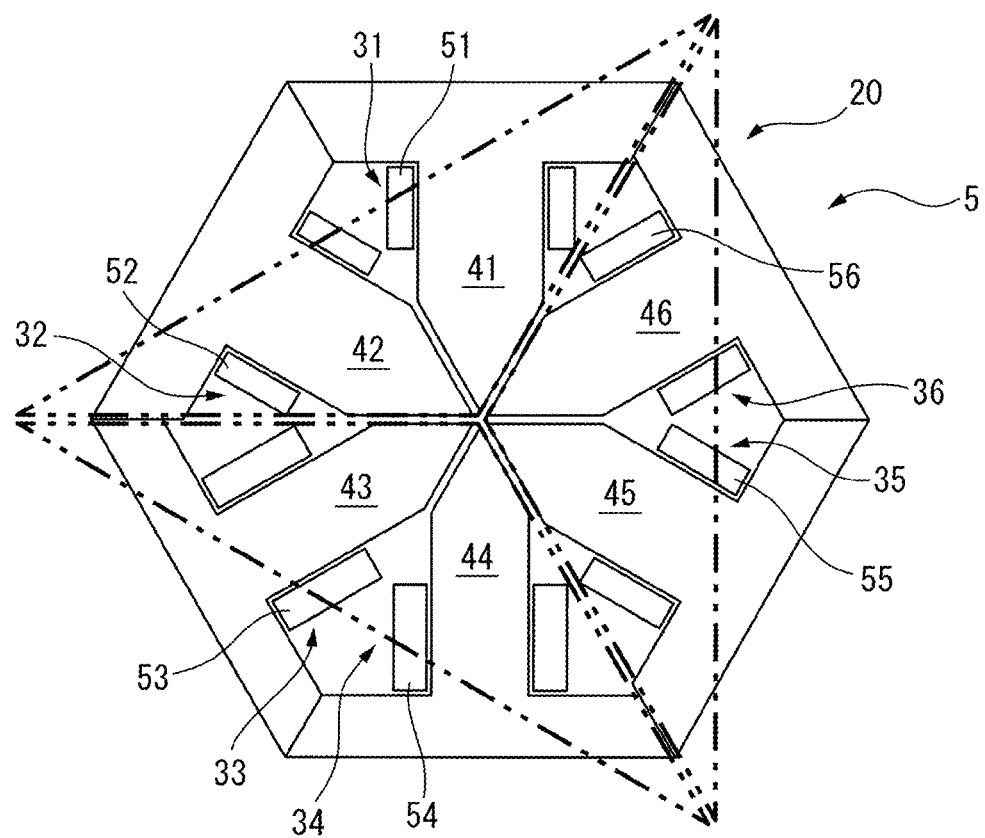
FIG. 10 is a sectional view of a single-phase reactor based on a ninth embodiment of the present invention.

FIG. 10 is a sectional view of a single-phase reactor based on a ninth embodiment of the present invention. The single-phase reactor 5 shown in FIG. 10 is substantially similar to the single-phase reactor 5 shown in FIG. 4. However, in the single-phase reactor 5 shown in FIG. 10, iron cores 41 and 42 are wider than iron cores 45 and 46, and the iron cores 45 and 46 are wider than iron cores 43 and 44. Further, the sectional areas of coils 51 and 52 wound around the iron cores 41 and 42 are smaller than the sectional areas of coils 55 and 56 wound around the iron cores 45 and 46, and the sectional areas of the coils 55 and 56 are smaller than the sectional areas of coils 53 and 54 wound around the iron cores 43 and 44.

Thus, as designated by two-dot chain lines in FIG. 10, the single-phase reactor 5 includes a first set comprised of two iron core coils 31 and 32, a second set comprised of another two iron core coils 33 and 34, and a third set comprised of still another two iron core coils 35 and 36. The first to third sets each include two adjacent ones of the six iron core coils 31 to 36.

In the single-phase reactor 5 shown in FIG. 10, the dimensions of the iron cores, the sectional areas of the coils, and the number of turns differ among the first to third sets. Note that, in the single-phase reactor 5, the dimensions of the gaps in the first set may be different from those in the other sets. It will be understood that such a configuration brings about an effect similar to the effect in the embodiment shown in FIG. 9. Alternatively, four or more reactors having different properties or the same property, i.e., four or more sets described above may be included in one single-phase reactor 5. It will be obvious that, even in this case, a similar effect can be obtained.

Figure 11:
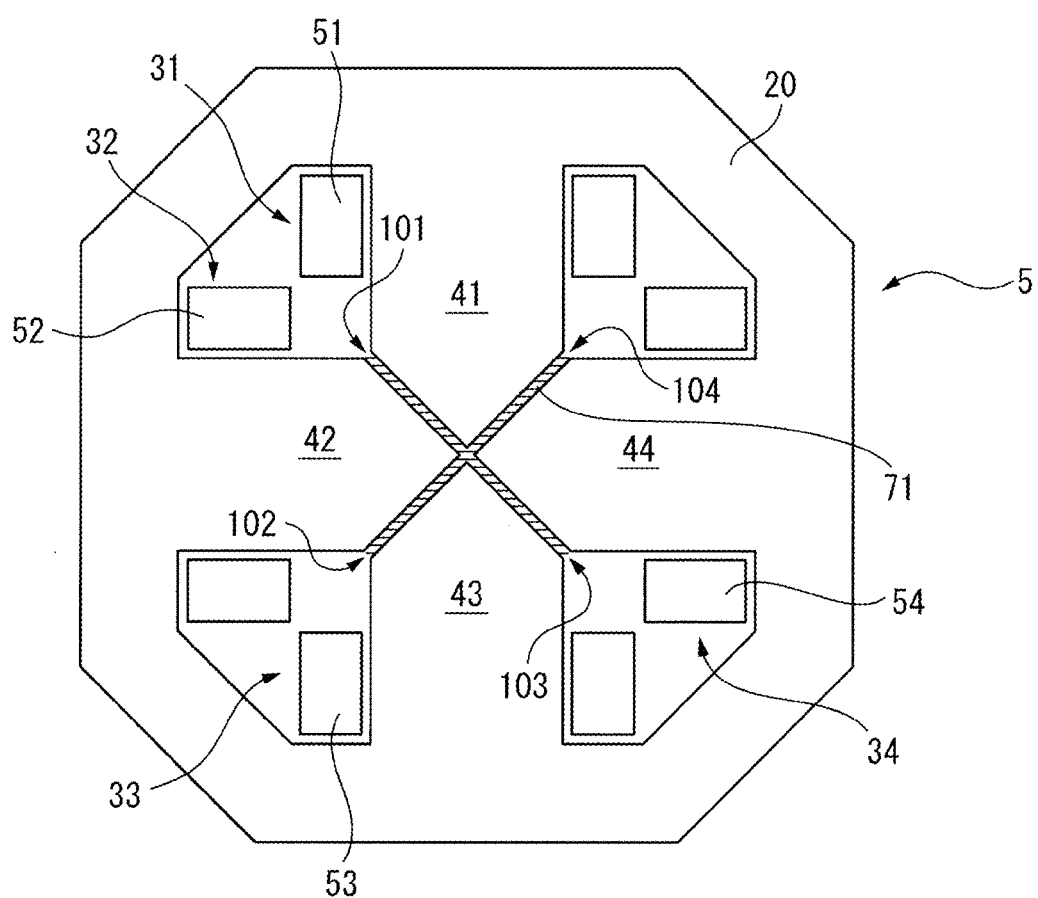
FIG. 11 is a sectional view of a single-phase reactor based on a tenth embodiment of the present invention.

FIG. 11 is a sectional view of a single-phase reactor based on a tenth embodiment of the present invention. The single-phase reactor 5 shown in FIG. 11 is substantially similar to the single-phase reactor 5 which has been described with reference to FIG. 1A, and accordingly, the description thereof is omitted. As shown in FIG. 11, a resin gap material 71 is charged into gaps 101 to 104 of the single-phase reactor 5.

In this case, the gap material 71 can be made by simply charging resin into the gaps 101 to 104 and curing the same. Thus, the gap material 71 can be easily made. Note that the gap material 71 may previously be made as a substantially X-shaped gap material similar to that shown in FIG. 11, or an L-shaped or plate-like gap material, in order to insert the previously made gap material 71 to the gaps 101 to 104 in place of charging resin. In such a case, the gap material 71 reduces the oscillation of the iron cores being in contact with the gaps 101 to 104, and accordingly, can reduce noises occurring from the iron cores. Likewise, gap materials can be easily made by charging resin into the iron core portion gaps shown in FIG. 5A and the outer peripheral iron core gaps shown in FIG. 8, and accordingly, it will be obvious that similar effects can be obtained in these gaps.

Figure 12:
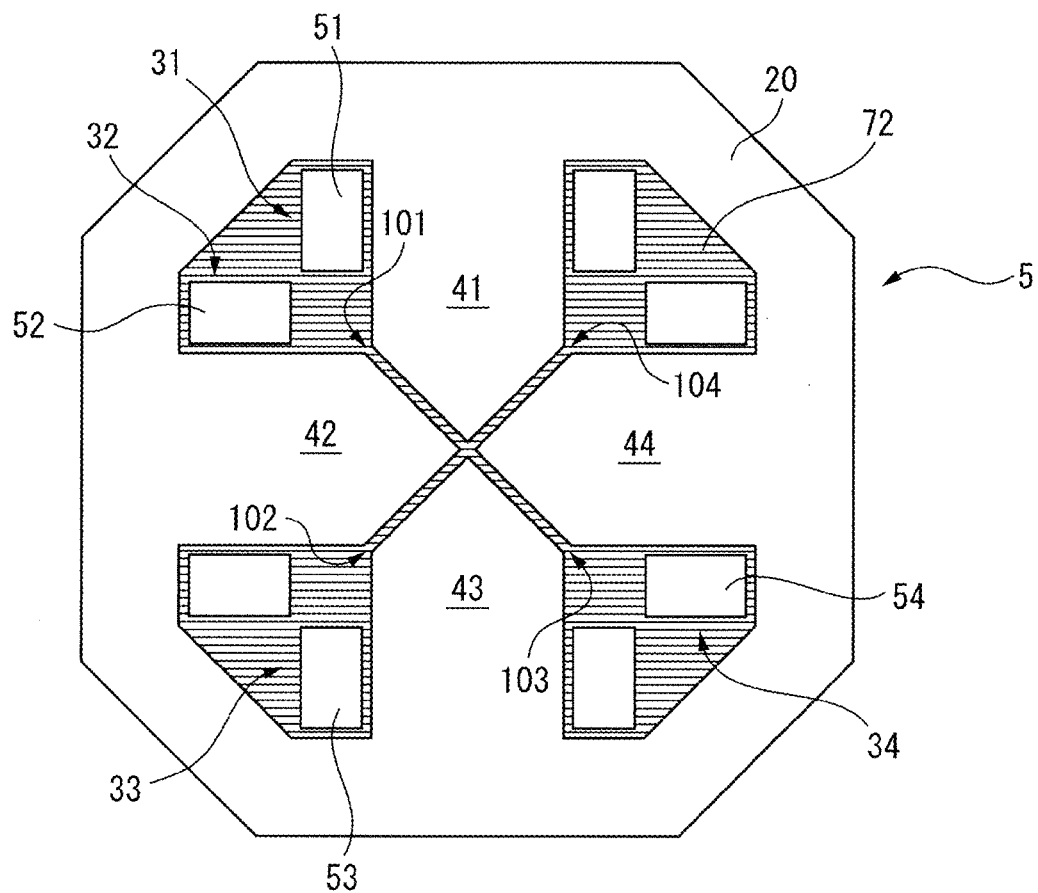
FIG. 12 is a sectional view of a single-phase reactor based on an eleventh embodiment of the present invention.

FIG. 12 is a sectional view of a single-phase reactor based on an eleventh embodiment of the present invention. The single-phase reactor 5 shown in FIG. 12 is substantially similar to the single-phase reactor 5 which has been described with reference to FIG. 1A, and accordingly, the explanation thereof is omitted. As shown in FIG. 12, the inside of the outer peripheral iron core 20 of the single-phase reactor 5 is filled with a resin insulating material 72.

In this case, the insulating material 72 can be easily made by simply charging resin into the inside of the outer peripheral iron core 20 and curing the same. In such a case, the insulating material 72 can reduce the occurrence of noises by reducing the oscillation of the iron core coils 31 to 34 or the outer peripheral iron core 20. Further, in the embodiment shown in FIG. 12, the insulating material can also promote temperature equilibration between the iron core coils 31 to 34 and the outer peripheral iron core 20.

Figure 15:
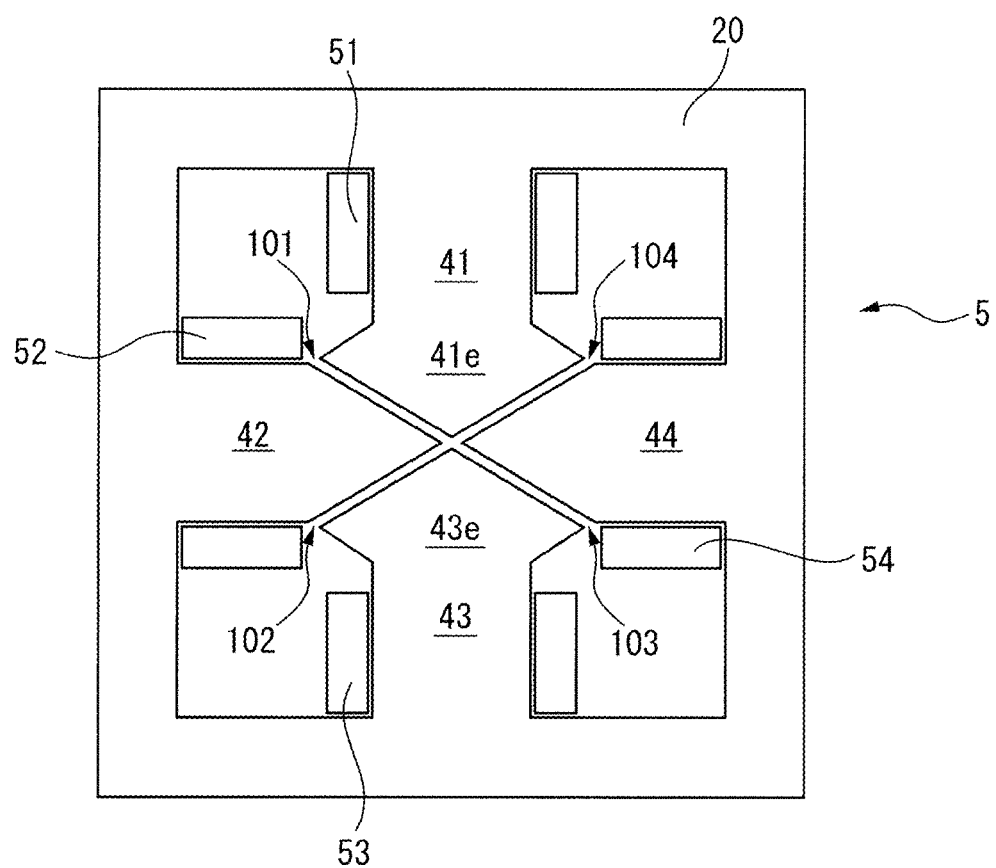
FIG. 15 is a sectional view of a single-phase reactor based on a twelfth embodiment of the present invention.
Figure 16:
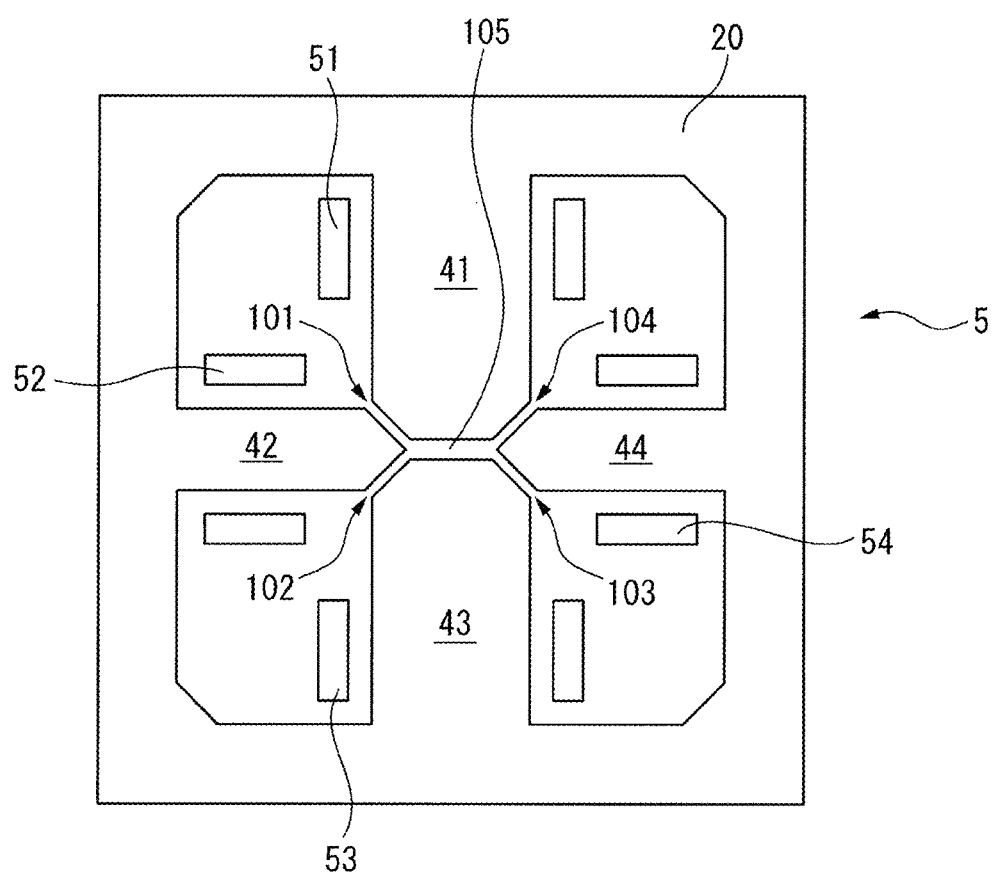
FIG. 16 is a sectional view of another single-phase reactor based on the twelfth embodiment of the present invention.

FIG. 15 and FIG. 16 are sectional views of single-phase reactors based on a twelfth embodiment of the present invention. FIG. 15 and FIG. 16 show substantially square single-phase reactors 5. As illustrated, iron cores 42 and 44, which are opposed to each other, have a shape similar to the aforementioned shape.

In contrast, at the tips of the other iron cores 41 and 43, wide portions 41e and 43e, which are wider than the main portions of the iron cores 41 and 43, are provided. The shape of the wide portions 41e and 43e corresponds to a part of a rhombus. However, the wide portions 41e and 43e may have another shape.

As illustrated, gaps 101 to 104, which can be magnetically coupled, are formed between the wide portions 41e and 43e of the iron cores 41 and 43 and the iron cores 42 and 44. The total length of the gaps 101 to 104 shown in FIG. 15 is larger than the total length of the gaps of another reactor which has a similar shape having no wide portions. Thus, increasing the total length of gaps enables enhancement of the inductance.

In the single-phase reactor 5 shown in FIG. 16, iron cores 41 and 43, which are opposed to each other, are entirely wider than the other iron cores 42 and 44, which are opposed to each other. Thus, in FIG. 16, the tips of the opposed iron cores 41 and 43 are flat, and an additional gap 105 is formed between the iron cores 41 and 43.

Thus, the total length of the gaps 101 to 104 and the additional gap 105 of the reactor 5 shown in FIG. 16 is larger than the total length of the gaps of a reactor 5 in which the width of the iron cores 41 and 43 is similar to the width of the iron cores 42 and 44. Likewise, in this case, the inductance can be enhanced.

Figure 17A:
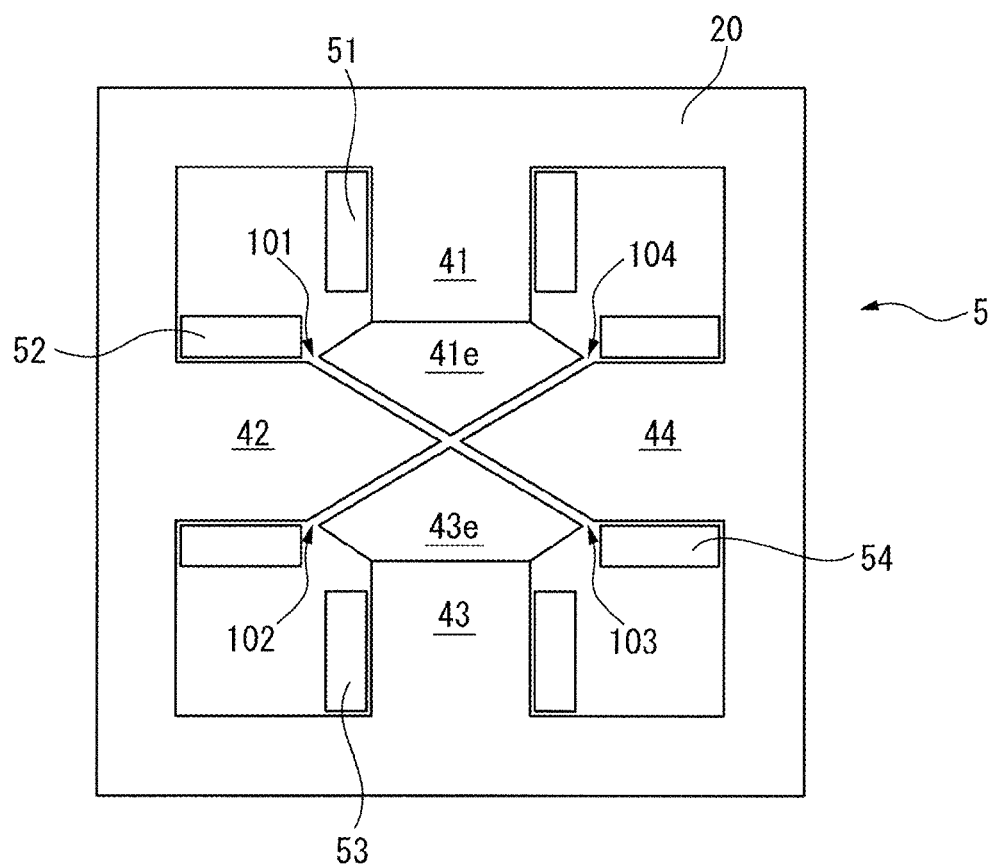
FIG. 17A is a sectional view of a single-phase reactor based on a thirteenth embodiment of the present invention.
Figure 17B:
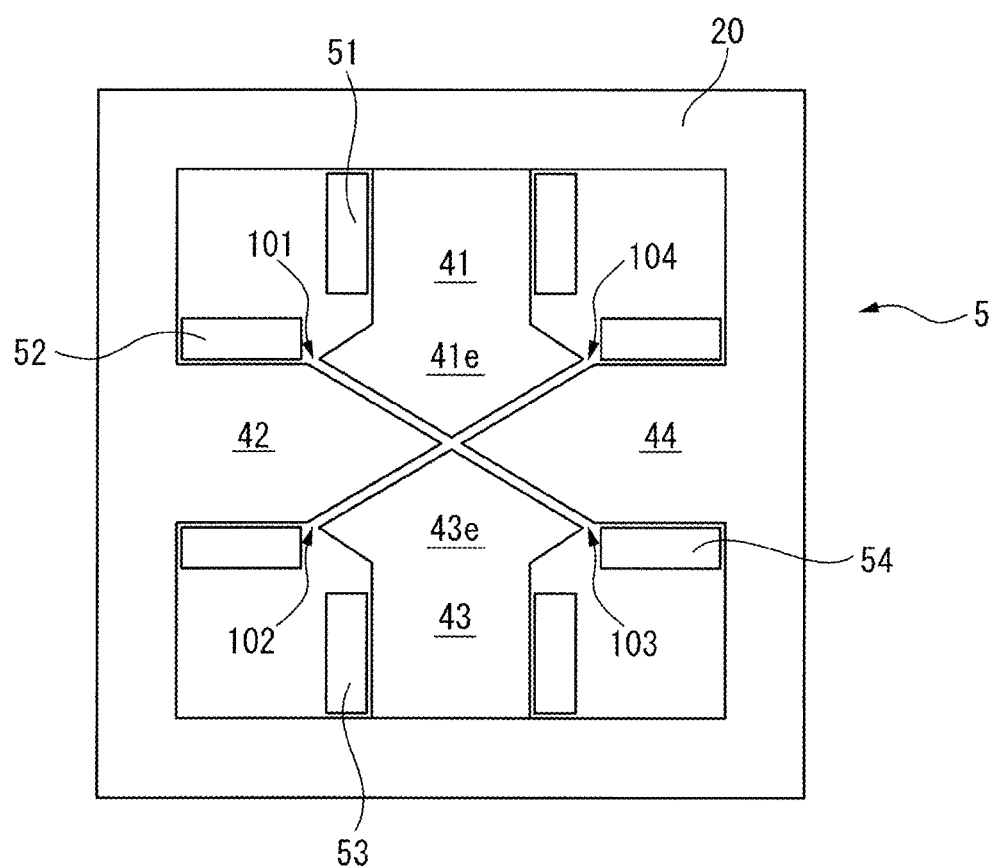
FIG. 17B is a sectional view of another single-phase reactor based on the thirteenth embodiment of the present invention.

FIG. 17A and FIG. 17B are sectional views of single-phase reactors based on a thirteenth embodiment of the present invention. The reactors 5 shown in FIG. 17A and FIG. 17B are substantially similar to the reactor 5 shown in FIG. 15.

However, in FIG. 17A, wide portions 41e and 43e can respectively be separated from the main portions of iron cores 41 and 43. Note that the wide portions 41e and 43e and the main portions of the iron cores 41 and 43 abut with each other, and no gaps are formed therebetween.

In such a case, coils 51 and 53 can be wound around the main portions of the iron cores 41 and 43 while the wide portions 41e and 43e are removed. Further, coils 52 and 54 are wound around iron cores 42 and 44 as usual. After that, the wide portions 41e and 43e are inserted from above, whereby the reactor 5 shown in FIG. 15 can be made.

If the wide portions 41e and 43e are not removed, it is difficult to wind the coils around the iron cores 41 and 43. Thus, it will be understood that, in the configuration shown in FIG. 17A, the reactor 5 can be easily assembled.

Likewise, in FIG. 17B, iron cores 41 and 43 themselves can be separated from the outer peripheral iron core 20. The iron cores 41 and 43 and the outer peripheral iron core 20 abut with each other, and no gaps are formed therebetween.

In this case, the iron cores 41 and 43 are removed from the reactor 5, and then, coils 51 and 53 are wound around the base end portions of the iron cores 41 and 43. Further, coils 52 and 54 are wound around the iron cores 42 and 44 as usual. After that, the iron cores 41 and 43 with the coils 51 and 53 are inserted from above, whereby the reactor 5 shown in FIG. 15 can be made. It will be obvious that, even in this case, the reactor 5 can be easily assembled.

Figure 18:
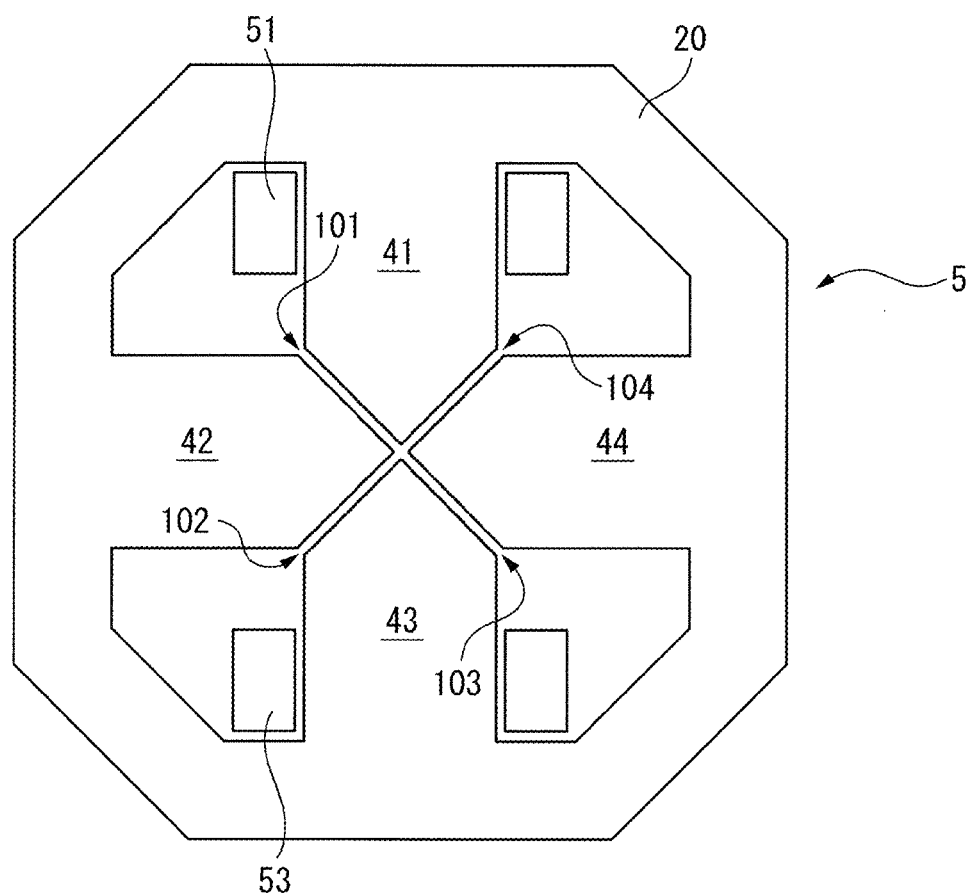
FIG. 18 is a sectional view of a single-phase reactor based on a fourteenth embodiment of the present invention.

FIG. 18 is a sectional view of a single-phase reactor based on a fourteenth embodiment of the present invention. FIG. 18 is similar to FIG. 1. However, in FIG. 18, the coils 52 and 54 shown in FIG. 1 are excluded. Thus, in FIG. 18, iron cores 41 and 43 with coils 51 and 53 and iron cores 42 and 44 without coils are alternately arranged.

Likewise, in the other reactors 5 described above, a coil may be excluded in some of the iron cores. However, in such a case, iron cores with coils and iron cores without coils do not necessarily have to be alternately arranged. It will be obvious that even such a configuration is included in the scope of the present invention, and an effect substantially similar to the aforementioned effect can be obtained.

Figure 19:
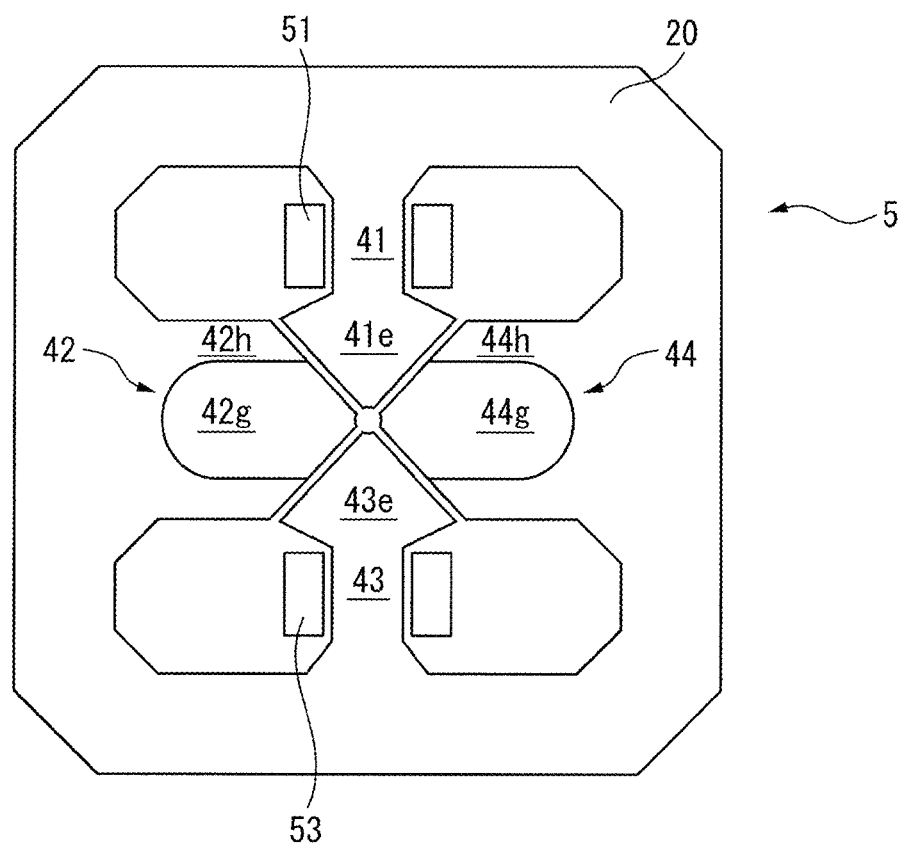
FIG. 19 is a sectional view of a single-phase reactor based on a fifteenth embodiment of the present invention.
Figure 20:
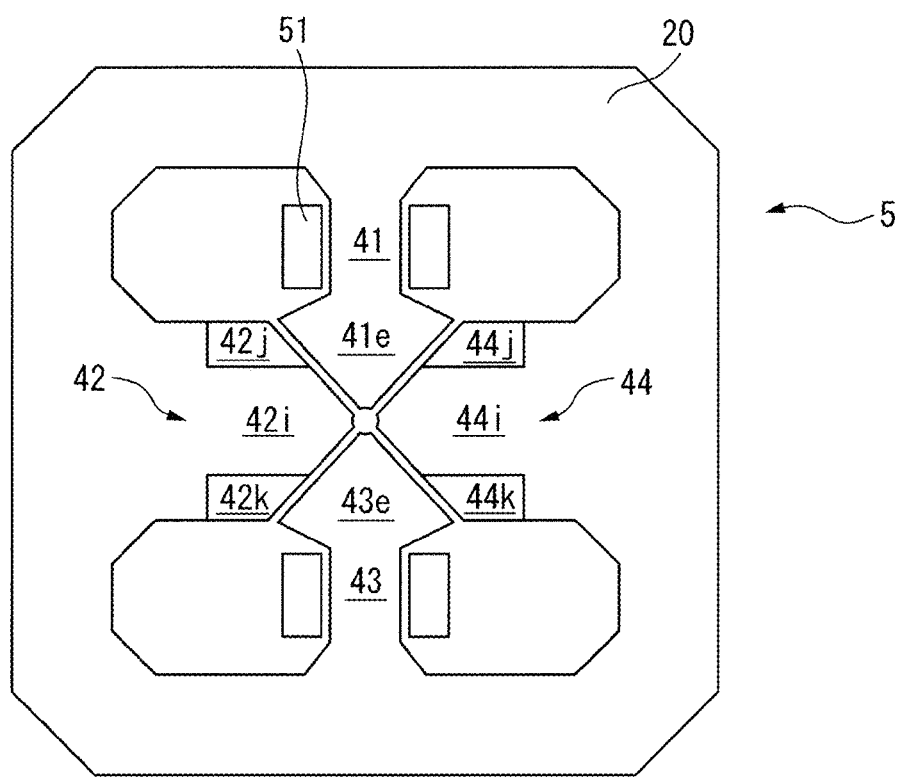
FIG. 20 is a sectional view of another single-phase reactor based on the fifteenth embodiment of the present invention.

FIG. 19 and FIG. 20 are sectional views of single-phase reactors based on a fifteenth embodiment of the present invention. In the reactor 5 shown in FIG. 19, iron cores 41 and 43 with wide portions 41e and 43e, which are each comprised of a part of a rhombus, are opposed to each other. Coils 51 and 53 are respectively wound around the iron cores 41 and 43. Further, each of the iron cores 41 and 43 is not divided, and accordingly, is a single member.

The other iron cores 42 and 44 are respectively comprised of U-shaped portions 42h and 44h, and reception portions 42g and 44g received by the U-shaped portions 42h and 44h. Note that gaps, which can be magnetically coupled, are formed between the iron cores 42 and 44 and the sides of the wide portions 41e and 43e of the iron cores 41 and 43. In FIG. 19, the iron cores 41 and 43 with the wide portions 41e and 43e, and the other iron cores 42 and 44 are alternately arranged.

The reactor 5 shown in FIG. 20 is substantially similar to the reactor 5 shown in FIG. 19. However, the shape of the iron cores 42 and 44 shown in FIG. 20 is different from the shape of the iron cores 42 and 44 shown in FIG. 19. The iron cores 42 and 44 shown in FIG. 20 are comprised of central portions 42i and 44i, and side portions 42j and 42k and 44j and 44k, which are coupled to both side faces of the central portions.

As shown in FIG. 19 and FIG. 20, the reactor 5 has line symmetry, and the iron cores 41 and 43 with the wide portions 41e and 43e, and iron cores 42 and 44 shaped into another shape may be alternately arranged. Further, coils may be wound around the iron cores 42 and 44. Alternatively, coils may be wound around only the iron cores 42 and 44, and coils 51 and 53 may be excluded. Further, as described above, a part of each of the iron cores 42 and 44 may be divided into a plurality of members. Even such a case is included in the scope of the present invention.

Figure 21:
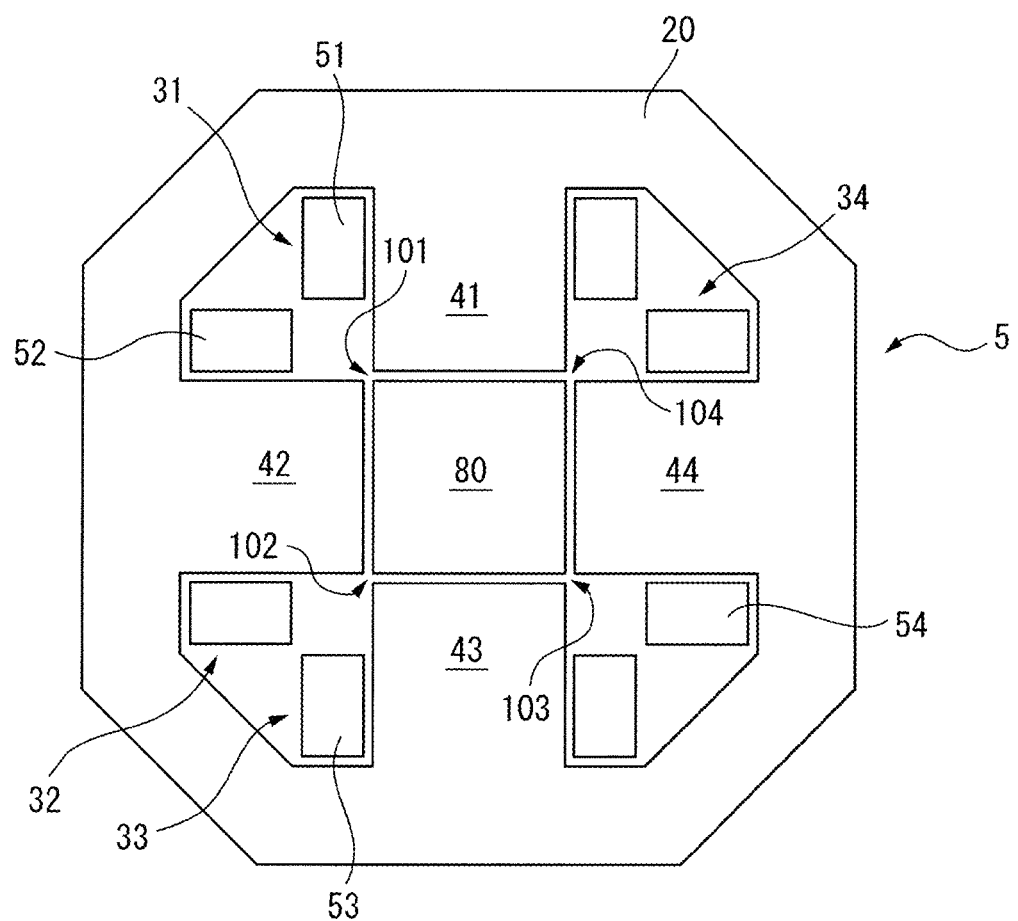
FIG. 21 is a sectional view of still another single-phase reactor of the present invention.

FIG. 21 is a sectional view of another single-phase reactor of the present invention. As shown in FIG. 21, the single-phase reactor 5 includes an outer peripheral iron core 20, and four iron core coils 31 to 34, which are magnetically coupled to the outer peripheral iron core 20. Further, a square central iron core 80 is disposed at the center of the single-phase reactor 5. Note that the central iron core 80 does not have to be square, and preferably has line symmetry or rotationally symmetry. The iron core coils are only required to be circumferentially arranged, and do not necessarily have to be arranged at equal intervals.

As can be seen from FIG. 21, the iron core coils 31 to 34 respectively include iron cores 41 to 44 which radially extend, and coils 51 to 54 wound around the iron cores. The radially outside ends of the iron cores 41 to 44 are in contact with the outer peripheral iron core 20, or are integral with the outer peripheral iron core 20.

Further, the radially inside ends of the iron cores 41 to 44 are positioned in the vicinity of the center of the outer peripheral iron core 20. In FIG. 21, the radially inside ends of the iron cores 41 to 44 are flat. The radially inside ends of the iron cores 41 to 44 are adjacent to the central iron core 80 via gaps 101 to 104 which can be magnetically coupled. Note that the gaps 101 to 104 have the same dimensions.

In this case, the four iron core coils 31 to 34 are surrounded by the outer peripheral iron core 20, and accordingly, magnetic fields occurring from the coils 51 to 54 do not leak to the outside of the outer peripheral iron core 20. Further, a reactor including a central iron core 80, which will be described later, has an effect substantially similar to the effect of the aforementioned reactors which do not have the central iron core 80.

The reactor shown in FIG. 21 and a reactor in another embodiment that will be described later have an effect that can adjust the inductance by changing the dimensions of the central iron core 80. In other words, the gaps 101 to 104 having a given thickness can be provided at a low cost. This is advantageous in design to reactors having a conventional configuration.

Figure 22:
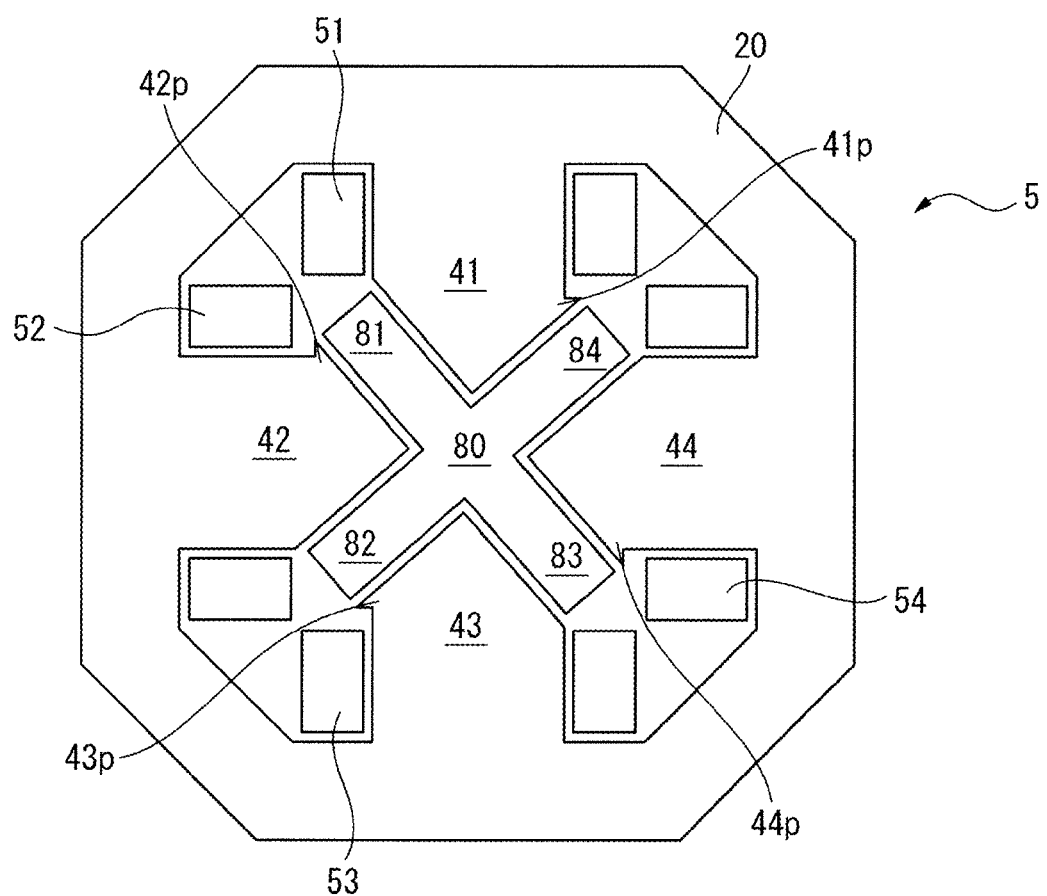
FIG. 22 is a sectional view of still another single-phase reactor of the present invention.

FIG. 22 is a sectional view of still another single-phase reactor of the present invention. In the following embodiment, an effect substantially similar to the effect of the reactor 5 shown in FIG. 21 can be obtained. The radially inside ends of the iron cores 41 to 44 of the single-phase reactor 5 shown in FIG. 22 converge on the center of the outer peripheral iron core 20, and the tip angle of each end is approximately 90 degrees.

Further, a central iron core 80 is disposed at the center of the single-phase reactor 5. As illustrated, the central iron core 80 has a substantially X-shaped configuration having four extensions 81 to 84. Further, the iron cores 41 to 44 respectively have, in the vicinity of their radially inside ends, substantially sector-shaped protrusions 41p to 44p, which clockwise extend. The protrusions 41p to 44p extend in areas between the end faces of adjacent coils in FIG. 1. The shape of the tip surfaces of the iron cores 41 to 44, to which the protrusions 41p to 44p are opposed, is configured to be complementary with the shape of the protrusions 41p to 44p. Note that the protrusions 41p to 44p may counterclockwise extend.

Both side faces of each of the extensions 81 to 84 are adjacent to the corresponding radially inside ends of the iron cores 41 to 44. Further, gaps, which can be magnetically coupled, are formed between both side faces of the extensions 81 to 84 of the central iron core 80 and the iron cores 41 to 44. Thus, the total length of the gaps increases, and consequently, the inductance can be enhanced.

Figure 23:
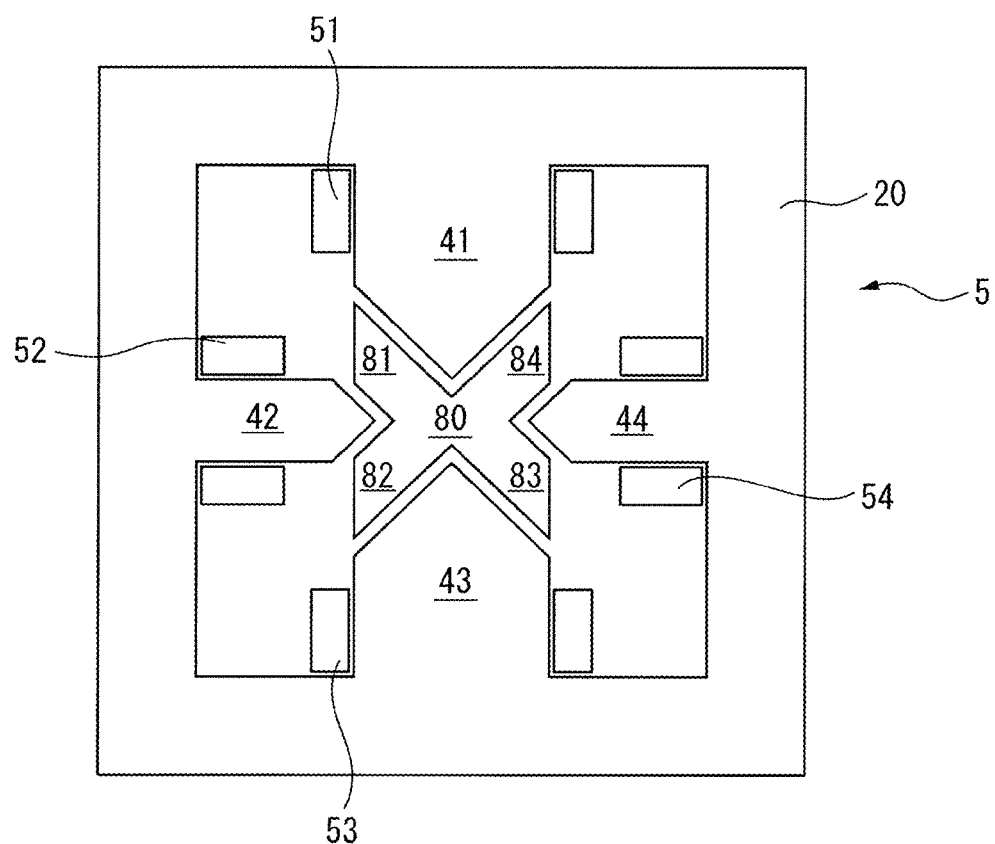
FIG. 23 is a sectional view of still another single-phase reactor of the present invention.

FIG. 23 is a sectional view of still another single-phase reactor of the present invention. The radially inside ends of the iron cores 41 to 44 converge on the center of the outer peripheral iron core 20, and the tip angle of each end is approximately 90 degrees. However, as illustrated, the iron cores 41 and 43 are wider than the other iron cores 42 and 44.

The reactor 5 shown in FIG. 23 includes a substantially X-shaped central iron core 80 having four extensions 81 to 84. The central iron core 80 is formed so that the radially inside ends of the iron cores 41 to 44 are each received between two adjacent ones of the extensions 81 to 84. Further, gaps, which can be magnetically coupled, are formed between both side faces of the extensions 81 to 84 of the central iron core 80 and the iron cores 41 to 44. Thus, it will be understood that an effect similar to the aforementioned effect can be obtained.

Figure 24:
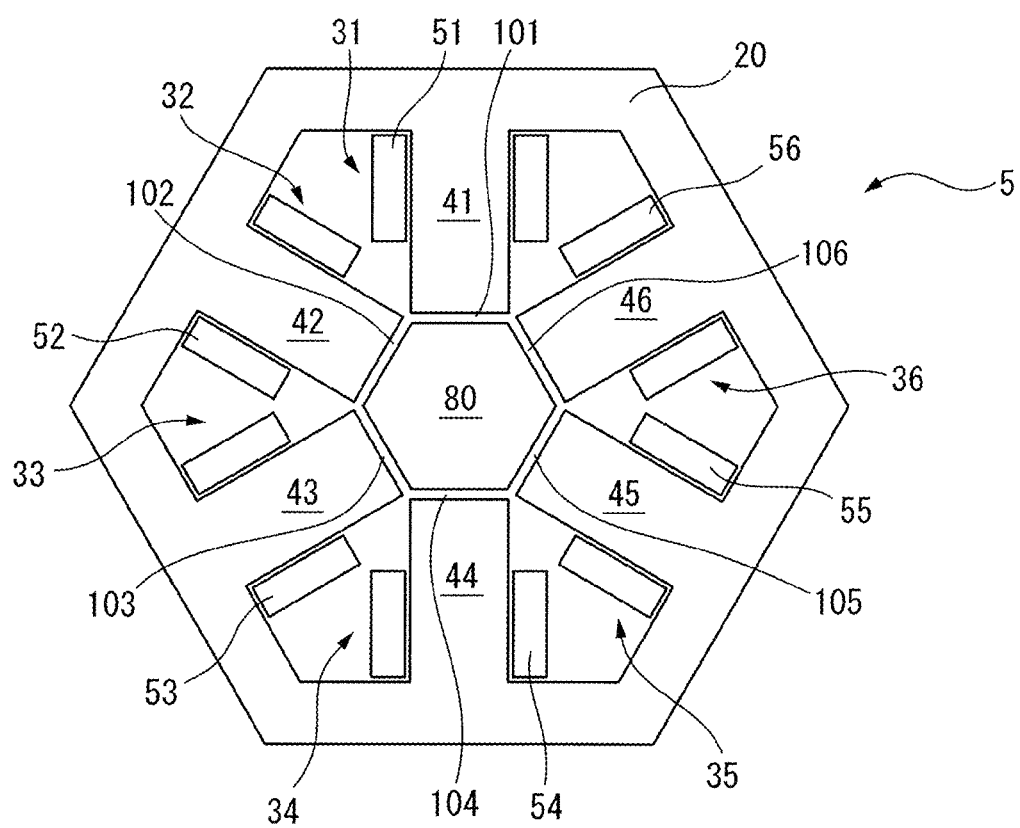
FIG. 24 is a sectional view of still another single-phase reactor of the present invention.

FIG. 24 is a sectional view of still another single-phase reactor of the present invention. The single-phase reactor 5 shown in FIG. 24 includes an outer peripheral iron core 20, a central iron core 80 having a substantially hexagonal shape, and iron core coils 31 to 36 similar to those described above. The iron core coils 31 to 36 respectively include iron cores 41 to 46, which radially extend, and coils 51 to 56 wound around the iron cores.

The radially inside ends of the iron cores 41 to 46 of the single-phase reactor 5 shown in FIG. 24 are flat. Further, the radially inside ends of the iron cores 41 to 46 are adjacent to the central iron core 80 via gaps 101 to 106 which can be magnetically coupled. As seen above, the single-phase reactor 5 may include iron core coils 31 to 36, the number of which is an even number not less than 6.

Figure 25:
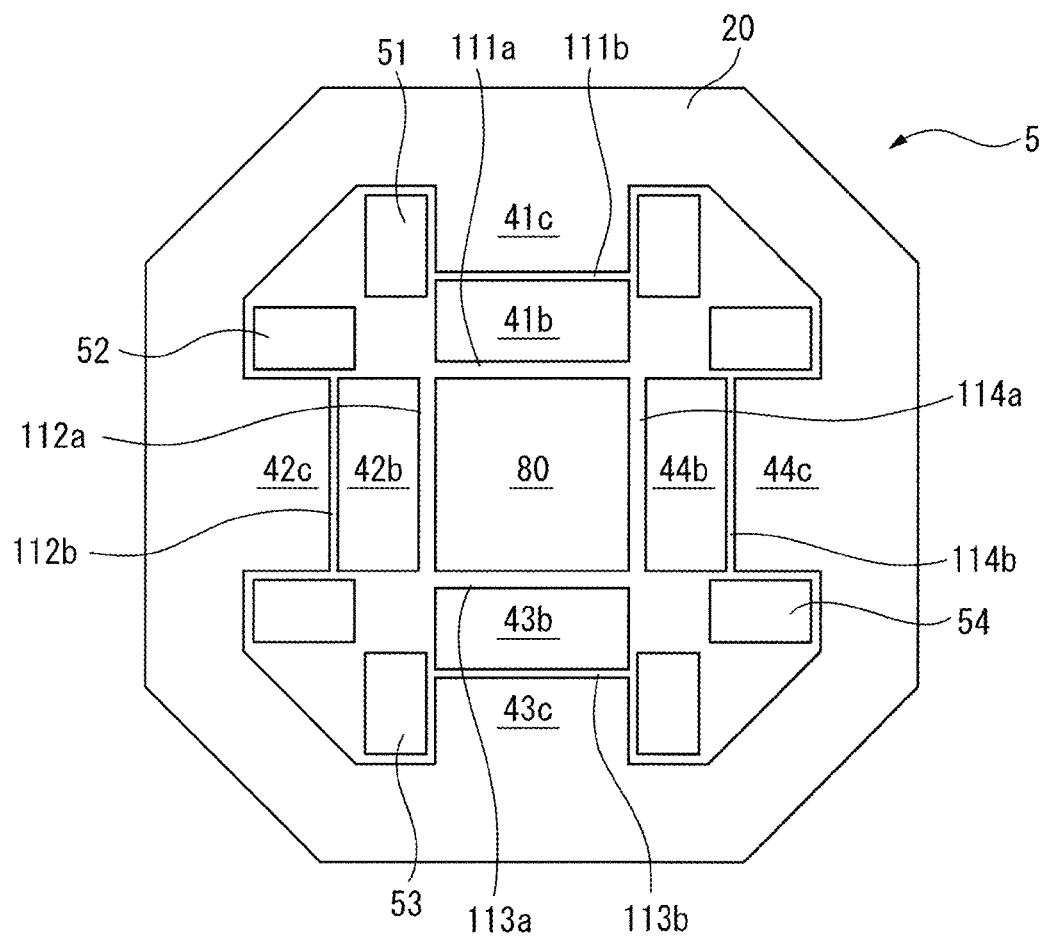
FIG. 25 is a sectional view of still another single-phase reactor of the present invention.

FIG. 25 is a sectional view of still another single-phase reactor of the present invention. The iron cores 41 to 44, which extend in the radial directions of the iron core coils 31 to 34 in the single-phase reactor 5 shown in FIG. 25, respectively include first iron core portions 41a to 44a positioned on the radially inside, and third iron core portions 41c to 44c positioned on the radially outside.

Iron core portion gaps 111a to 114a, which can be magnetically coupled, are formed between a central iron core 80 and first iron core portions 41a to 44a. Further, iron core portion gaps 111b to 114b, which can be magnetically coupled, are formed between the first iron core portions 41a to 44a and the third iron core portions 41c to 44c.

In such a case, for one iron core, e.g., the iron core 41, the first iron core portion gap 111a and the second iron core portion gap 111b are formed, and accordingly, the thickness of each gap is small. The thickness of each gap can be reduced, and accordingly, the leakage flux from each gap can be reduced. Further, the iron cores 41 to 44 are each comprised of a plurality of iron core portions, and accordingly, the single-phase reactor 5 can be easily assembled. Note that, of course, the iron cores 41 to 44 may be each comprised of three or more iron core portions arranged in a line.

Figure 26:
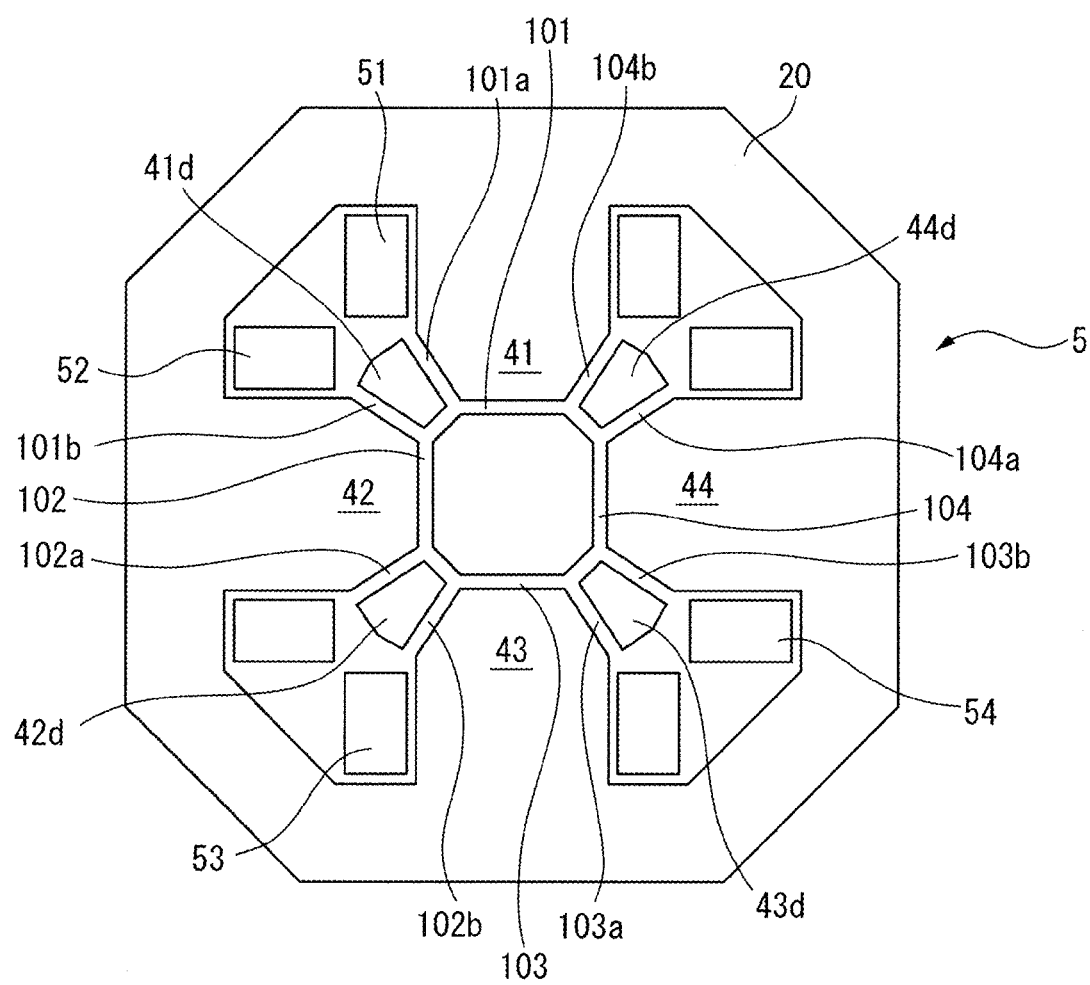
FIG. 26 is a sectional view of still another single-phase reactor of the present invention.

FIG. 26 is a sectional view of still another single-phase reactor of the present invention. In FIG. 26, additional iron cores 41d to 44d are each disposed between the corresponding two adjacent ones of iron cores 41 to 43. The cross-sectional surface of each of the additional iron cores 41d to 44d is a part of a sector. Note that the cross-sectional surface of each of the additional iron cores 41d to 44d may be a part of an isosceles triangle.

The radially inside ends of the iron cores 41 to 44 each include two tip surfaces and a flat surface between the two tip surfaces. As shown in FIG. 26, each of the two flat surfaces of the additional iron cores 41d to 44d is parallel to the adjacent one of the tip surfaces of the iron cores. Gaps 101a to 104a and 101b to 104b, which can be magnetically coupled, are formed between the flat surfaces of the additional iron cores 41d to 44d and the tip surfaces of the iron cores 41 to 44. Further, gaps 101 to 104, which can be magnetically coupled, are formed between the flat surfaces of the iron cores 41 to 44 and the central iron core 80. Further, gaps (having no reference numerals), which can be magnetically coupled, are formed between the tips of the additional iron cores 41d to 44d and the central iron core 80.

In FIG. 26, the total length of the gaps is increased, and accordingly, the inductance can be increased. Further, in this case, the thickness of each gap can be reduced, and accordingly, the leakage flux can be further reduced.

Figure 27:
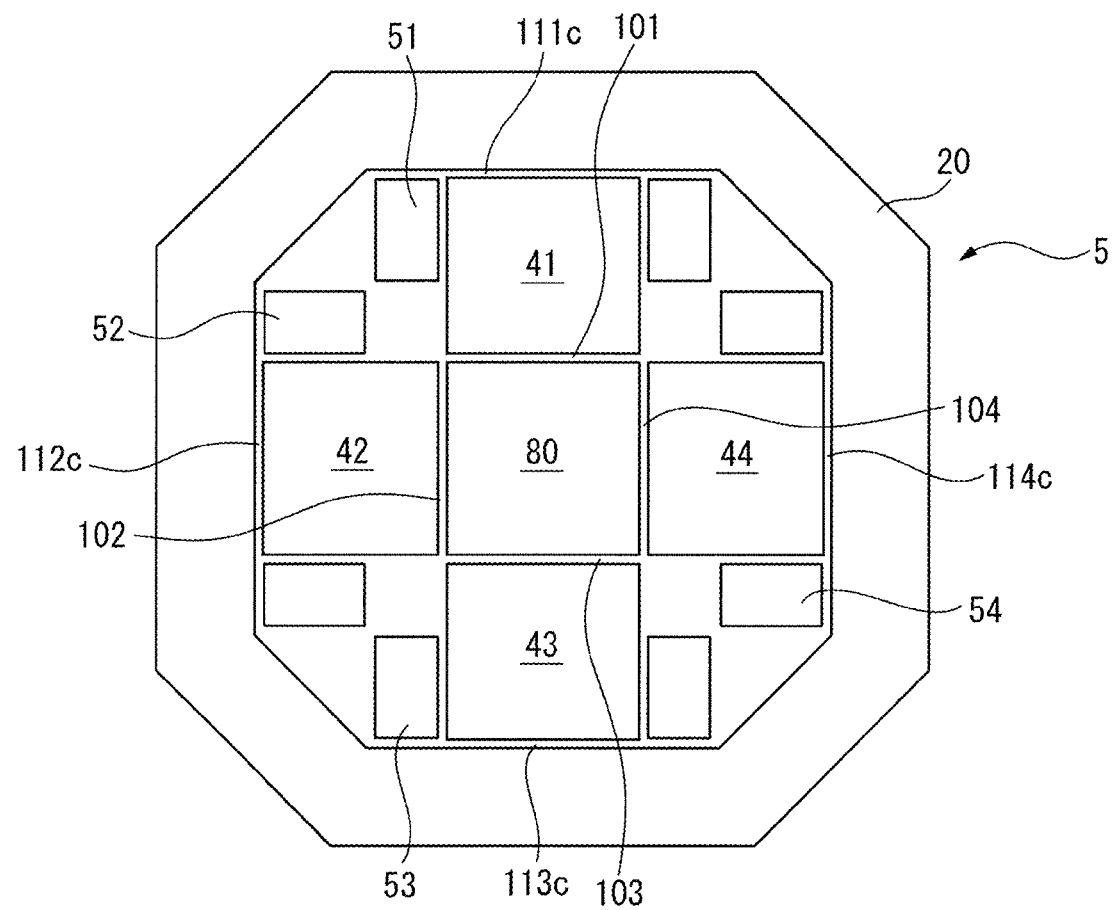
FIG. 27 is a sectional view of still another single-phase reactor of the present invention.

FIG. 27 is a sectional view of still another single-phase reactor of the present invention. In the single-phase reactor 5 shown in FIG. 27, outer peripheral iron core gaps 111c to 114c, which can be magnetically coupled, are respectively formed between the radially outside ends of iron cores 41 to 44 and an outer peripheral iron core 20. When the single-phase reactor 5 operates, heat occurs in the iron core coils 31 to 34. In this embodiment, the outer peripheral iron core gaps 111c to 114c are formed, and accordingly, the heat occurring from the iron core coils 31 to 34 is difficult to transfer to the outer peripheral iron core 20.

Figure 28:
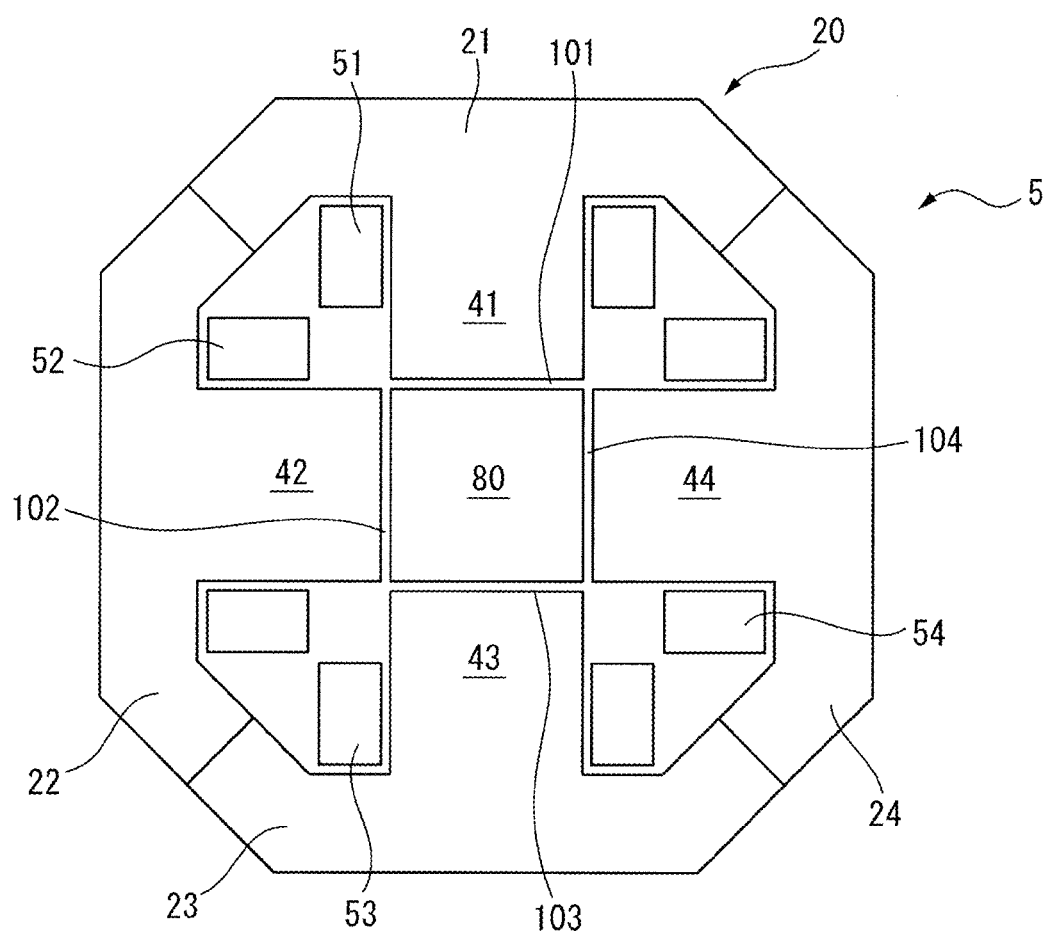
FIG. 28 is a sectional view of still another single-phase reactor of the present invention.

FIG. 28 is a sectional view of a single-phase reactor based on a sixth embodiment of the present invention. In the single-phase reactor 5 shown in FIG. 28, an outer peripheral iron core 20 is comprised of a plurality of, e.g., four outer peripheral iron core portions 21 to 24. In FIG. 28, the outer peripheral iron core portion 21 is in contact with or integral with an iron core 41. Likewise, the outer peripheral iron core portions 22 to 24 are respectively in contact with or integral with iron cores 42 to 44. In the embodiment shown in FIG. 28, even if the outer peripheral iron core 20 is large, such an outer peripheral iron core 20 can be easily produced.

Figure 29:
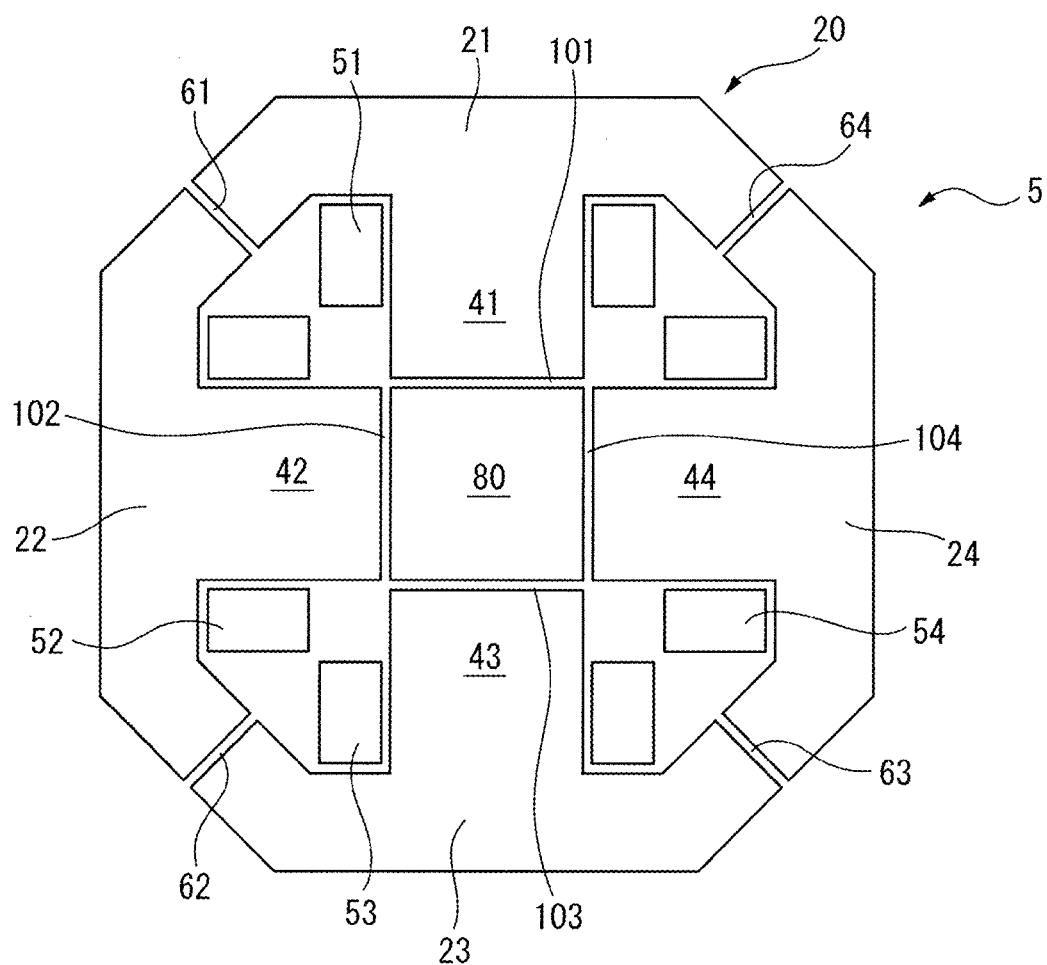
FIG. 29 is a sectional view of still another single-phase reactor of the present invention.

FIG. 29 is a sectional view of another single-phase reactor of the present invention. In the reactor 5 shown in FIG. 29, outer peripheral iron core portions 21 to 24 are disposed via outer peripheral iron core portion gaps 61 to 64. In such a case, the outer peripheral iron core portion gaps 61 to 64 can be adjusted by adjusting the lengths of the outer peripheral iron core portions 21 to 24. Consequently, it will be understood that the unbalance of the inductance of the single-phase reactor 5 can be adjusted.

The single-phase reactor 5 shown in FIG. 29 differs from the single-phase reactor 5 shown in FIG. 28 only in that it has the outer peripheral iron core portion gaps 61 to 64. In the embodiments shown in FIG. 28 and FIG. 29, even if the outer peripheral iron core 20 is large, such an outer peripheral iron core 20 can be easily produced.

Figure 30:
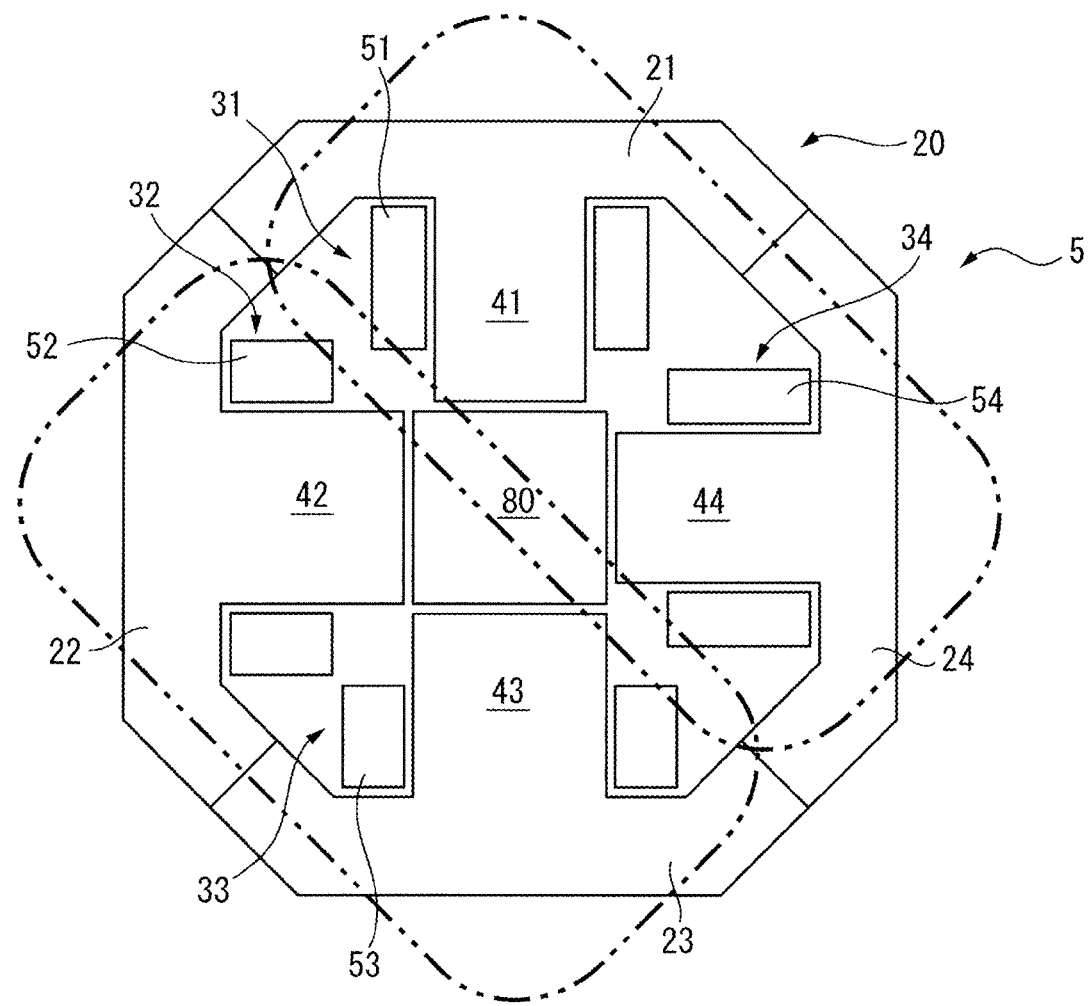
FIG. 30 is a sectional view of still another single-phase reactor of the present invention.

FIG. 30 is a sectional view of still another single-phase reactor of the present invention. In the single-phase reactor 5 shown in FIG. 30, the sectional areas of coils 51 and 54 of iron core coils 31 and 34 are larger than the sectional areas of coils 52 and 53 of iron core coils 32 and 33. Further, iron cores 41 and 44 of the iron core coils 31 and 34 are narrower than iron cores 42 and 43 of the iron core coils 32 and 33. Note that gaps 101 to 104 have the same dimensions.

In other words, as designated by two-dot chain lines in FIG. 30, the single-phase reactor 5 includes a first set comprised of two iron core coils 31 and 34 and a second set comprised of the other two iron core coils 32 and 33. The first set and the second set each include two adjacent ones of the four iron core coils 31 to 34. In the single-phase reactor 5 shown in FIG. 30, the dimensions of the iron cores, the sectional areas of the coils, and the number of turns differ between the first set and the second set. Note that, in the single-phase reactor 5, the dimensions of the gaps in the first set may be different from those in the second set.

Thus, two reactors having different properties can substantially be included in one single-phase reactor 5. Thus, the installation space for two reactors having different properties can be reduced. Further, it will be understood that connecting two reactors in series or in parallel enables adjustment of the inductance value.

Figure 31:
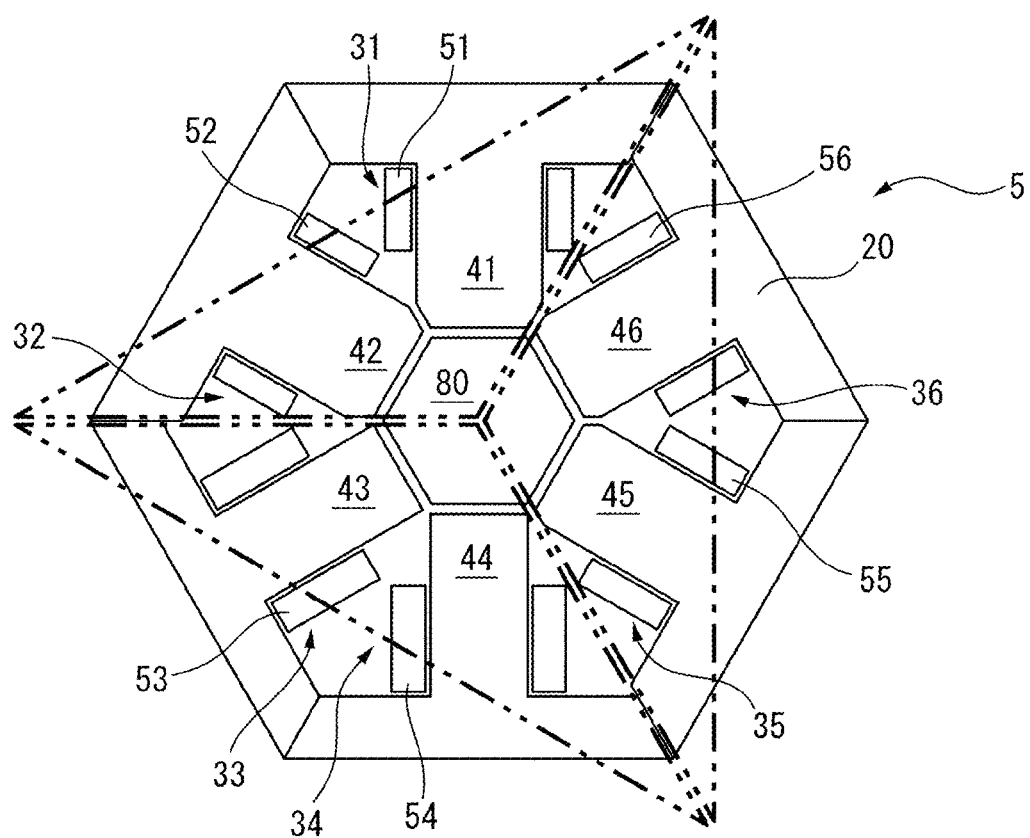
FIG. 31 is a sectional view of still another single-phase reactor of the present invention.

FIG. 31 is a sectional view of still another single-phase reactor of the present invention. In the single-phase reactor 5 shown in FIG. 31, iron cores 41 and 42 are wider than iron cores 45 and 46, and the iron cores 45 and 46 are wider than iron cores 43 and 44. Further, the sectional areas of coils 51 and 52 wound around the iron cores 41 and 42 are smaller than the sectional areas of coils 55 and 56 wound around the iron cores 45 and 46, and the sectional areas of the coils 55 and 56 are smaller than the sectional areas of coils 53 and 54 wound around the iron cores 43 and 44.

Thus, as designated by two-dot chain lines in FIG. 31, the single-phase reactor 5 includes a first set comprised of two iron core coils 31 and 32, a second set comprised of another two iron core coils 33 and 34, and a third set comprised of still another two iron core coils 35 and 36. The first to third sets each include two adjacent ones of the six iron core coils 31 to 36.

In the single-phase reactor 5 shown in FIG. 31, the dimensions of the iron cores, the sectional areas of the coils, and the number of turns differ among the first to third sets. Note that, in the single-phase reactor 5, the dimensions of the gaps in the first set may be different from those in the other sets. It will be understood that such a configuration brings about an effect similar to the effect in the embodiment shown in FIG. 30. Alternatively, four or more reactors having different properties or the same property, i.e., four or more sets described above may be included in one single-phase reactor 5. It will be obvious that, even in this case, a similar effect can be obtained.

Figure 32:
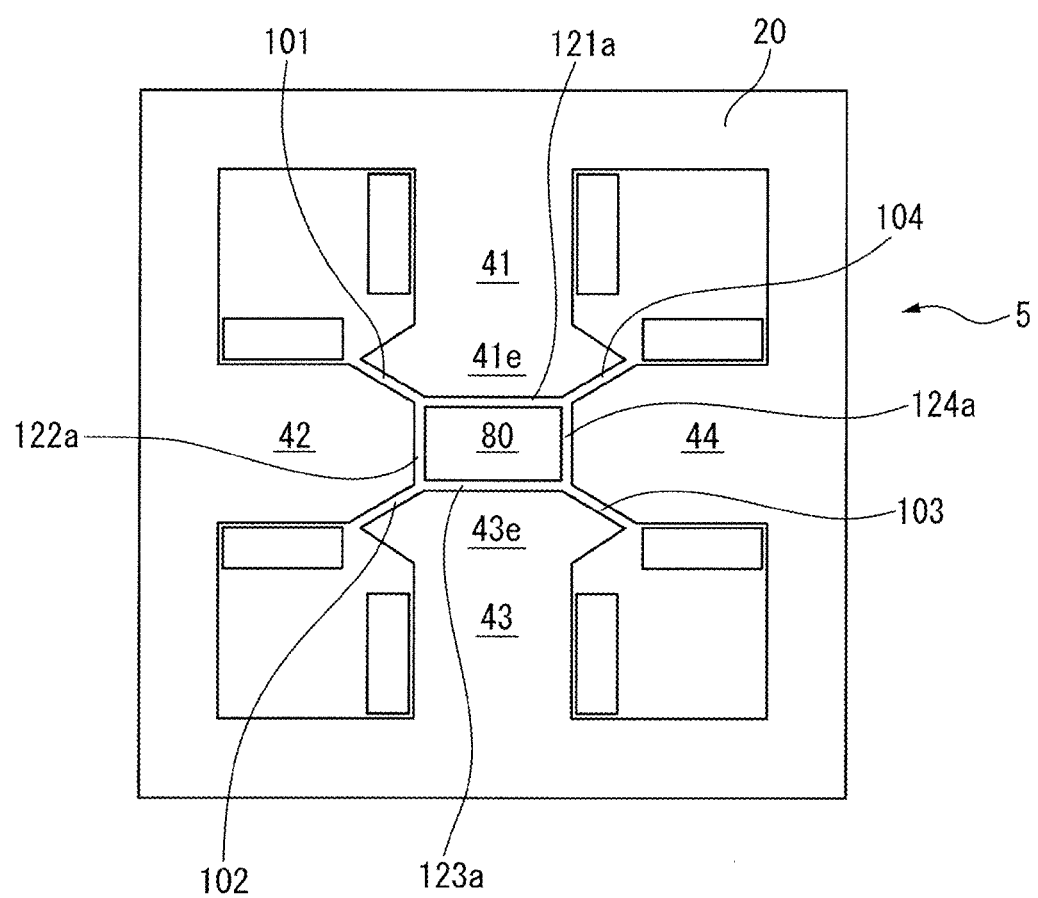
FIG. 32 is a sectional view of still another single-phase reactor of the present invention.
Figure 33:
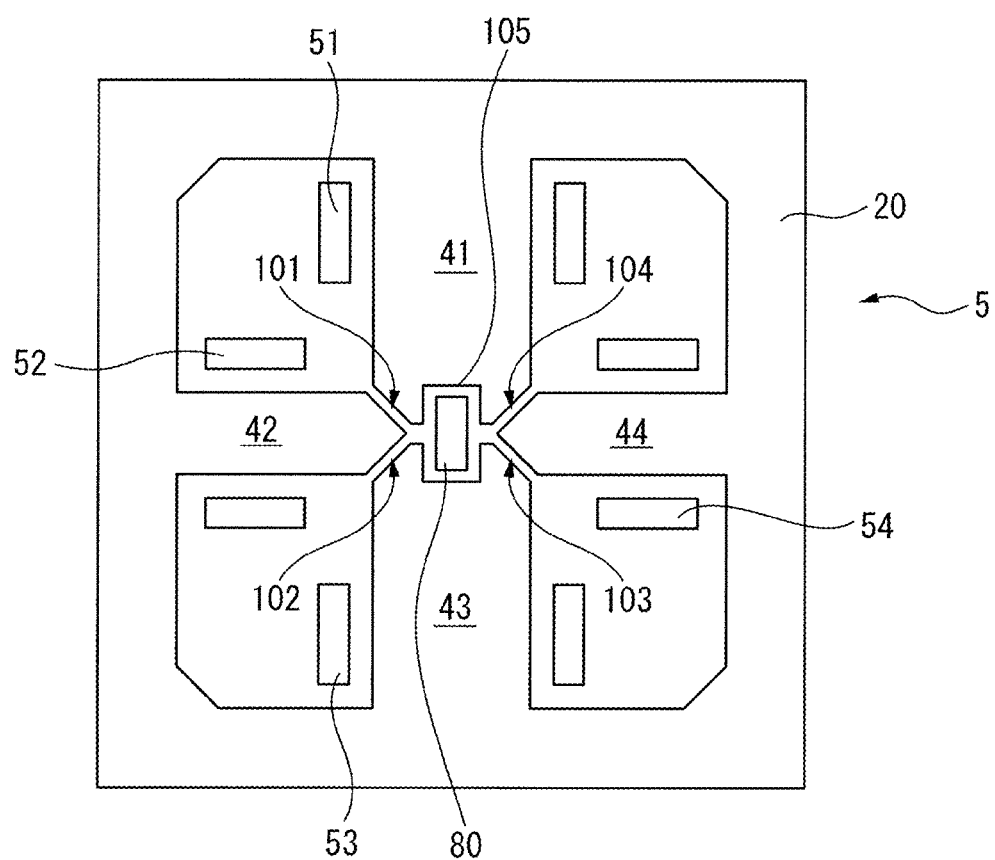
FIG. 33 is a sectional view of still another single-phase reactor of the present invention.

FIG. 32 and FIG. 33 are sectional views of still another single-phase reactor of the present invention. FIG. 32 and FIG. 33 show substantially square single-phase reactors 5. As illustrated, iron cores 42 and 44, which are opposed to each other, have a shape similar to the aforementioned shape.

In contrast, at the tips of the other iron cores 41 and 43 which are opposed to each other, wide portions 41e and 43e, which are wider than the main portions of the iron cores 41 and 43, are provided. The shape of the wide portions 41e and 43e corresponds to a part of a rhombus. However, the wide portions 41e and 43e may have another shape.

Gaps 101 to 104, which can be magnetically coupled, are formed between the wide portions 41e and 43e of the iron cores 41 and 43 and the iron cores 42 and 44. Further, gaps 121a to 124a, which can be magnetically coupled, are formed between the wide portions 41e and 43e of the iron cores 41 and 43 and a central iron core 80, and between the iron cores 42 and 44 and the central iron core 80. The total length of the gaps 101 to 104 and the gaps 121a to 124a in FIG. 32 is larger than the total length of the gaps of another reactor which has a similar shape having no wide portions.

In the single-phase reactor 5 shown in FIG. 33, iron cores 41 and 43, which are opposed to each other, are entirely wider than the other iron cores 42 and 44, which are opposed to each other. Further, recesses are formed in the flat surfaces of the opposed iron cores 41 and 43 of the reactor 5 in FIG. 33, and the central iron core 80 is disposed in these recesses. Thus, an additional gap 105 having a rectangular shape is formed between the central iron core 80 and the iron cores 41 and 43.

Figure 34:
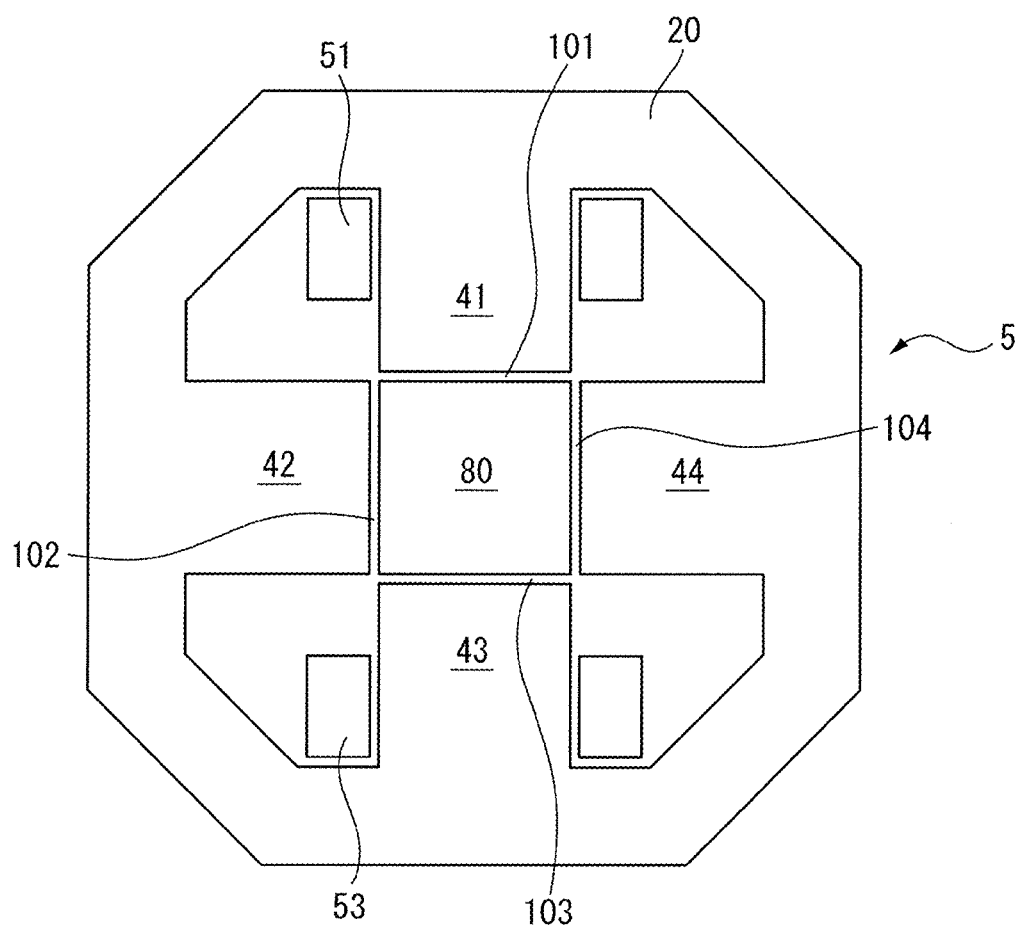
FIG. 34 is a sectional view of still another single-phase reactor of the present invention.

Thus, the total length of the gaps 101 to 104 and the additional gap 105 of the reactor 5 shown in FIG. 33 is larger than the total length of the gaps of a reactor 5 in which the width of the iron cores 41 and 43 is similar to the width of the iron cores 42 and 44. As shown in FIG. 32 and FIG. 34, when the total length of the gaps is increased, the inductance can be enhanced.

Note that the gap material 71 or 72, which has been described with reference to FIG. 11 and FIG. 12, may be disposed in the reactor 5 having the central iron core 80.

FIG. 34 is a sectional view of still another single-phase reactor of the present invention. FIG. 34 is similar to FIG. 21. However, in FIG. 34, the coils 52 and 54 shown in FIG. 21 are excluded. Thus, in FIG. 34, the iron cores 41 and 43 with the coils 51 and 53, and the iron cores 42 and 44 without coils are alternately arranged.

Likewise, in the other reactors 5 described above, a coil may be excluded in some of the iron cores. However, in such a case, iron cores with coils and iron cores without coils do not necessarily have to be alternately arranged. It will be obvious that even such a configuration is included in the scope of the present invention, and an effect substantially similar to the aforementioned effect can be obtained.

Figure 35:
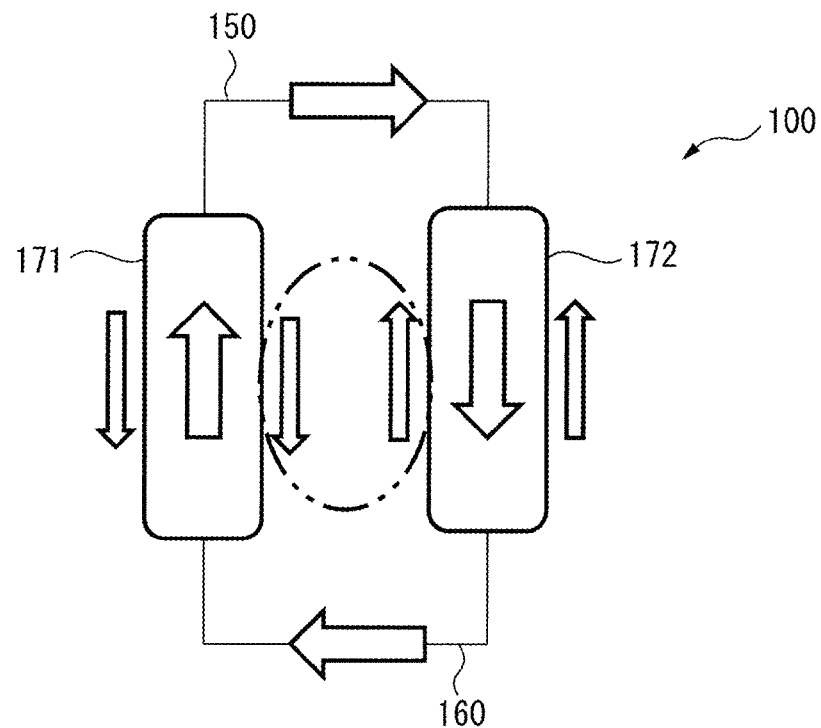
FIG. 35 is a schematic view of a conventional single-phase reactor.

FIG. 35 is a schematic view of a conventional single-phase reactor. In a single-phase reactor 100 shown in FIG. 35, coils 171 and 172 are disposed between two substantially C-shaped iron cores 150 and 160. Thus, the coils 171 and 172 are disposed in parallel with each other.

In FIG. 35, when a magnetic flux passes through two adjacent coils as designated by wide arrows, magnetic fluxes outside the coils act, as designated by narrow arrows, on each other so as to cancel each other. This increases the magnetic resistance, and thus, there is a tendency that the inductance value of the single-phase reactor 100 shown in FIG. 35 is larger than a theoretical value.

Figure 36:
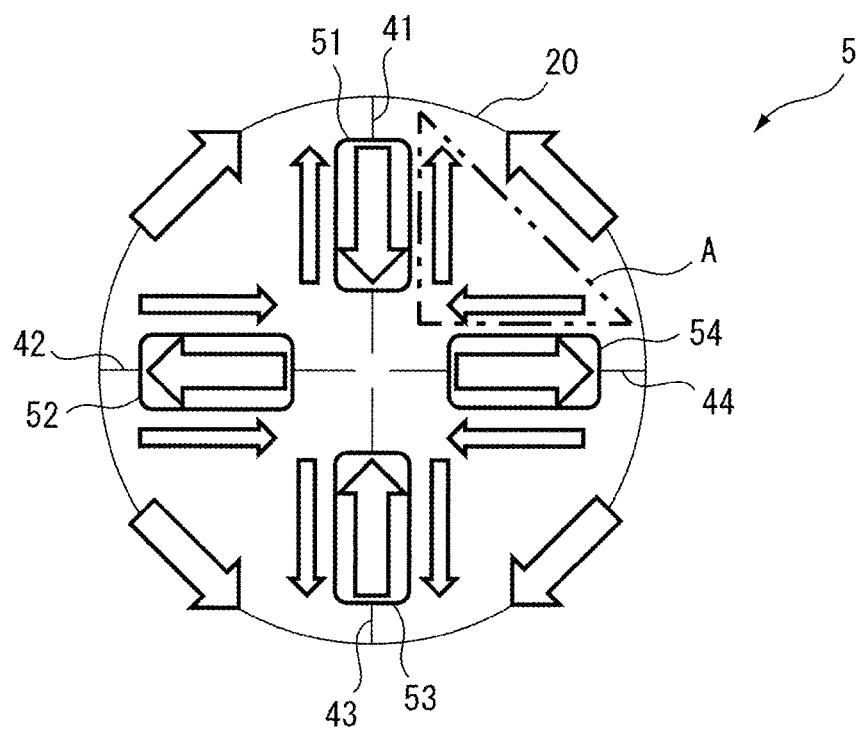
FIG. 36 is a schematic view of the single-phase reactor shown in FIG. 1A.

FIG. 36 is a schematic view of the single-phase reactor shown in FIG. 1A. In this case, the two adjacent coils, e.g., coils 52 and 53 are not parallel to each other, and make an angle of approximately 90°. Thus, even if a magnetic flux passes through the two adjacent coils as designated by wide arrows, magnetic fluxes outside the coils do not cancel each other as designated by narrow arrows. Thus, in the single-phase reactor 5 of the present invention, the magnetic resistance does not increase. Thus, the inductance value of the single-phase reactor 5 is substantially similar to a theoretical value. It will be obvious that, as the angle between the two adjacent coils increases, such an inductance value further approaches a theoretical value.

Figure 37:
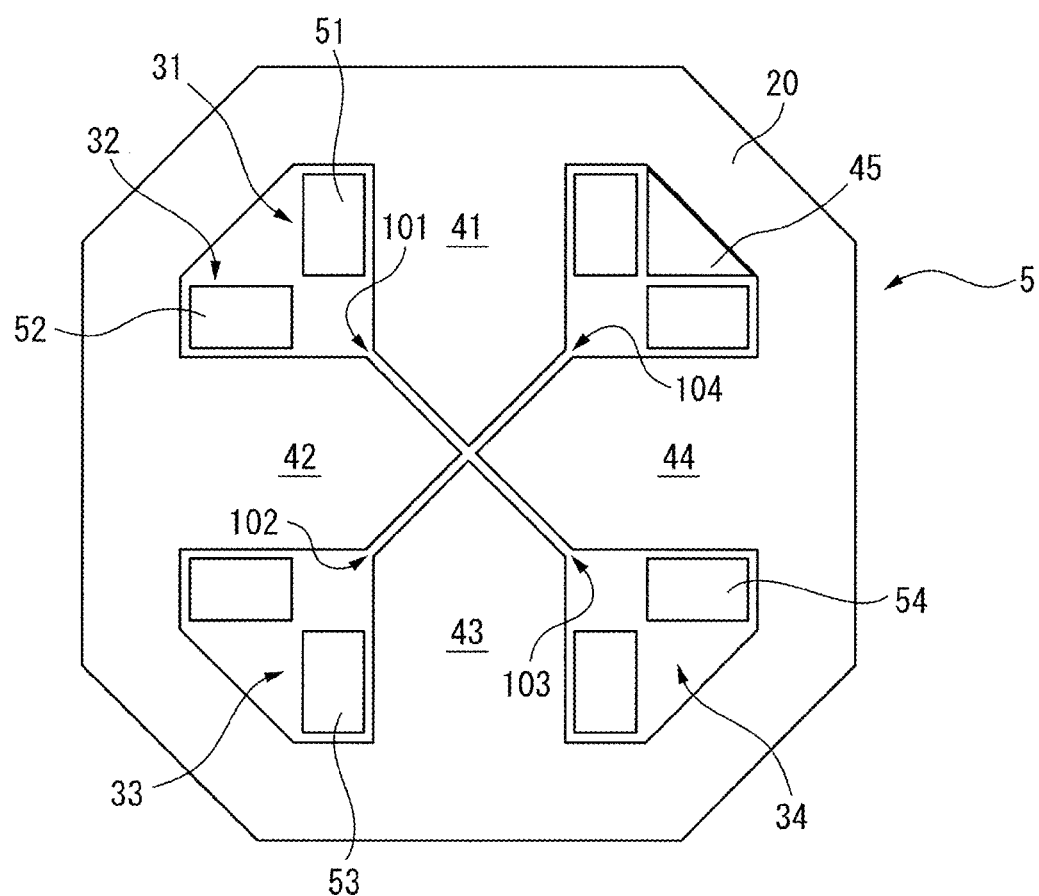
FIG. 37 is a sectional view of a single-phase reactor based on still another embodiment of the present invention.

When an iron core is disposed between the two adjacent coils, the inductance value further approaches a theoretical value. Thus, it is preferable to dispose an additional iron core in, e.g., an area A shown in FIG. 36. Here, FIG. 37 is a sectional view of a single-phase reactor based on still another embodiment of the present invention. In FIG. 37, an additional iron core 45 having a section formed like an isosceles triangle is disposed at a place corresponding to the area A in FIG. 36. As illustrated, the sides of the cross-sectional surface of the additional iron core 45, which include a vertex angle, are generally equal to the thickness of the coils 51 and 54. In other words, regarding the arrangement of the iron core coils in FIG. 36, arranging an iron core in an immediate vicinity of the outside of adjacent iron core coils prevents magnetic fluxes, which flow outside the adjacent iron core coils, from interfering with each other. This causes, as if the two adjacent iron core coils act as a single iron core coil, an increase or decrease in each magnetic flux. In this respect, the fluctuation of inductance of each phase per cycle in the current waveform is more moderate than that in the arrangement of the iron core coils in FIG. 35, and accordingly, the hysteresis loss of the iron core material can be reduced.

In FIG. 37, the coils 51 and 54 are in contact with the inner surface of the outer peripheral iron core 20. Thus, the coils 51 and 54 are surrounded by the iron cores 41 and 44, the outer peripheral iron core 20, and the additional iron core 45. In other words, three sides of the cross-sectional surfaces of the coils 51 and 54 are in contact with the iron cores 41 and 44, the outer peripheral iron core 20, and the additional iron core 45. In such a case, it will be understood that the aforementioned effect is high. Note that, in the single-phase reactor 5 shown in FIG. 37, the additional iron core 45 may be disposed in at least two areas between adjacent ones of the coils 51 to 54. The additional iron core 45 may be integral with the outer peripheral iron core 20.

Figure 13:
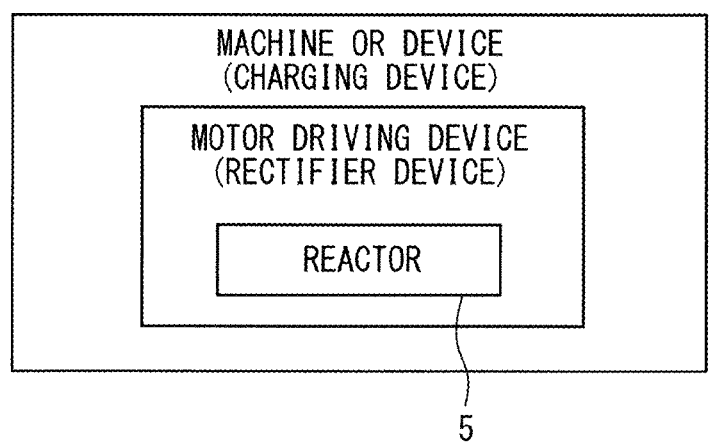
FIG. 13 is a view of a machine or device including a single-phase reactor of the present invention.

FIG. 13 is a view of a machine or device including the single-phase reactor of the present invention. In FIG. 13, the single-phase reactor 5 is used in a motor driving device. The machine or device includes such a motor driving device.

As can be seen from FIG. 13, the single-phase reactor 5 may be included in a rectifier device for converting direct current into alternating current in, e.g., photovoltaic generation. Such a rectifier device may be provided in a charging device, e.g., a charging device for vehicles. In such a case, it will be understood that the motor driving device, the rectifier device, the machine, the charging device, etc. which include the single-phase reactor 5 can easily be provided. Any appropriate combination of these embodiments is included in the scope of the present invention.

Contents of Disclosure

According to a first aspect, there is provided a single-phase reactor including an outer peripheral iron core, and at least four iron core coils, which are in contact with or coupled to the inner surface of the outer peripheral iron core. The at least four iron core coils each include an iron core, and a coil wound around the iron core. Gaps, which can be magnetically coupled, are each formed between two adjacent ones of the at least four iron core coils.

According to a second aspect, in the reactor according to the first aspect, the number of the at least four iron core coils is an even number not less than 6.

According to a third aspect, in the reactor according to the first or second aspect, the iron cores of the at least four iron core coils are each comprised of a plurality of iron core portions.

According to a fourth aspect, in the reactor according to the third aspect, iron core portion gaps, which can be magnetically coupled, are each formed between adjacent ones of the plurality of iron core portions.

According to a fifth aspect, in the reactor according to any of the first to fourth aspects, outer peripheral iron core gaps, which can be magnetically coupled, are formed between the iron cores of the at least four iron core coils and the outer peripheral iron core.

According to a sixth aspect, in the reactor according to any of the first to fifth aspects, the outer peripheral iron core is comprised of a plurality of outer peripheral iron core portions.

According to a seventh aspect, in the reactor according to the sixth aspect, outer peripheral iron core portion gaps are each formed between adjacent ones of the plurality of outer peripheral iron core portions.

According to an eighth aspect, in the reactor according to any of the first to seventh aspects, the single-phase reactor comprises a first set comprised of at least two iron core coils, and a second set comprised of the other at least two iron core coils.

According to a ninth aspect, in the reactor according to the eighth aspect, the single-phase reactor has three or more sets each comprised of at least two iron core coils.

According to a tenth aspect, in the reactor according to any of the first to ninth aspects, a gap material that is a non-magnetic material, or an insulating paper or resin is inserted or charged into at least one of the gaps, the iron core portion gaps, or the outer peripheral iron core portion gaps in the single-phase reactor.

According to an eleventh aspect, in the reactor according to any of the first to ninth aspects, a gap material that is a non-magnetic material, or an insulating material or resin is charged into the inside of the outer peripheral iron core in the single-phase reactor.

According to a twelfth aspect, there is provided a motor driving device including the single-phase reactor according to any of the first to eleventh aspects.

According to a thirteenth aspect, there is provided a machine including the single-phase reactor according to any of the first to eleventh aspects.

According to a fourteenth aspect, there is provided a rectifier device including the single-phase reactor according to any of the first to eleventh aspects.

According to a fifteenth aspect, there is provided a charging device including the rectifier device according to the fourteenth aspect.

Effects of Aspects

In the first aspect, the gaps, which can be magnetically coupled, are disposed in the vicinity of the center of the single-phase reactor. Further, the angle between the iron cores with a gap being located therebetween is less than 180 degrees. Thus, the leakage flux from each iron core tends to easily enter the adjacent and nearest iron core, and accordingly, the leakage flux penetrating through the coil can be reduced more than a conventional case. Further, the coils can be positioned away from the gaps. Thus, the proportion of the leakage flux from the vicinity of each gap, which penetrates through a winding, can be reduced. Consequently, the eddy current loss in each coil can be reduced.

In the second aspect, the number of iron core coils is an even number not less than 6, and accordingly, there are a plurality of iron core coils for one phase. Further, the sectional area of each iron core coil can be reduced by connecting the iron core coils in parallel. Further, the inductance can be adjusted by connecting the iron core coils in series or in parallel.

In the third aspect, each iron core is comprised of a plurality of iron core portions, and accordingly, the reactor can be easily assembled.

In the fourth aspect, the gaps among the iron core coils as well as the iron core portion gaps among the iron core portions are formed, and accordingly, the dimensions of each gap can be reduced. Thus, the magnetic flux leaking from each gap can be reduced, and accordingly, the eddy current loss, due to the leaked magnetic flux, in each coil can be reduced.

In the fifth aspect, the outer peripheral iron core gaps are formed between the outer peripheral iron core and the iron core coils, and accordingly, the heat occurring from the iron core coils is difficult to transfer to the outer peripheral iron core.

In the sixth aspect, the outer peripheral iron core is divided into a plurality of portions. Thus, even if the outer peripheral iron core is large, the outer peripheral iron core can be easily produced.

In the seventh aspect, the unbalance of the inductance can be easily adjusted by adjusting the outer peripheral iron core portion gaps.

In the eighth aspect, the functions of two single-phase reactors can be included in one single-phase reactor, and accordingly, when two single-phase reactors are necessary, the installation space can be reduced. Further, the inductance value can be adjusted by connecting these single-phase reactors in parallel or in series.

In the ninth aspect, the functions of three or more single-phase reactors can be included in one single-phase reactor, and accordingly, when three or more single-phase reactors are necessary, the installation space can be reduced. Further, the inductance value can be adjusted by connecting three or more single-phase reactors in parallel or in series.

In the tenth aspect, the oscillation of the iron cores in contact with the gaps can be reduced, and the noises occurring from the iron cores can be reduced.

In the eleventh aspect, the temperature equilibration between the iron core coils and the outer peripheral iron core is promoted, and the noises occurring from the iron core coils or the outer peripheral iron core can be reduced.

In the twelfth and thirteenth aspects, a motor driving device including the single-phase reactor, and a machine including the single-phase reactor can be easily provided.

In the fourteenth and fifteenth aspects, a rectifier device characterized in that the single-phase reactor is provided as an alternating-current reactor on the alternating-current side of the rectifier device, a smoothing reactor on the direct-current side, or at least one of reactors constituting an LC filter, and a charging device including the rectifier device can be easily provided.

The present invention has been described above using exemplary embodiments. However, a person skilled in the art would understand that the aforementioned modifications and various other modifications, omissions, and additions can be made without departing from the scope of the present invention.

What is claimed is:

1. A single-phase reactor comprising:
   an outer peripheral iron core;
   at least four iron cores being in contact with or coupled to the inner surface of the outer peripheral iron core, each of the at least four iron cores extending from the outer peripheral iron core at right angles with respect to adjacent ones of the at least four iron cores;
   coils wound around each of the at least four iron cores;
   at least four gaps formed between the adjacent ones of the at least four iron cores, and each of the at least four gaps radially extending at right angles with respect to adjacent ones of the at least four gaps to a common connection point at a center of the outer peripheral iron core; and
   at least one additional iron core positioned in at least one of four areas surrounded by the outer peripheral iron core and the coils wound around the adjacent ones of the at least four iron cores.

2. The single-phase reactor of claim 1, wherein the at least one additional iron core has a triangular shape.

3. The single-phase reactor of claim 2, wherein the triangular shape is an isosceles triangle.

4. The single-phase reactor of claim 1, wherein sides of the at least one additional iron core are equal to a thickness of the coils.

5. The single-phase reactor of claim 1, wherein the at least one additional iron core is in contact with the outer peripheral iron core.

6. A motor driving device comprising the single-phase reactor according to claim 1.

7. A machine comprising the single-phase reactor according to claim 1.

8. A rectifier device comprising the single-phase reactor according to claim 1.

9. A charging device comprising the rectifier device according to claim 8.

* * * * *